United States Patent

Bauer

(10) Patent No.: US 12,465,880 B2
(45) Date of Patent: Nov. 11, 2025

(54) CLEANING METHOD, CONTROL APPARATUS AND CONNECTING DEVICE

(71) Applicant: BOEHRINGER INGELHEIM PHARMA GMBH & CO. KG, Ingelheim am Rhein (DE)

(72) Inventor: Rainer Bauer, Ingelheim am Rhein (DE)

(73) Assignee: BOEHRINGER INGELHEIM PHARMA GMBH & CO. KG, Ingelheim am Rhein (DE)

( * ) Notice: Subject to any disclaimer, the term of this patent is extended or adjusted under 35 U.S.C. 154(b) by 102 days.

(21) Appl. No.: 18/107,693

(22) Filed: Feb. 9, 2023

(65) Prior Publication Data

US 2023/0226478 A1 Jul. 20, 2023

Related U.S. Application Data

(62) Division of application No. 15/522,960, filed as application No. PCT/EP2015/073793 on Oct. 14, 2015, now abandoned.

(30) Foreign Application Priority Data

Oct. 28, 2014 (DE) ..................... 20 2014 008 509.9
Oct. 28, 2014 (EP) ..................... 14003655

(51) Int. Cl.
*B01D 46/00* (2022.01)
*B01D 46/04* (2006.01)
(Continued)

(52) U.S. Cl.
CPC ............. *B01D 46/04* (2013.01); *B01D 46/10* (2013.01); *B01D 46/56* (2022.01); *B01D 46/58* (2022.01); *B01D 46/71* (2022.01); *B01D 46/4272* (2013.01)

(58) Field of Classification Search
CPC ........ B01D 46/04; B01D 46/58; B01D 46/71; B01D 46/56; B01D 46/10; B01D 46/4272
(Continued)

(56) References Cited

U.S. PATENT DOCUMENTS 3,129,892 A * 4/1964 Tillman .................. B05B 1/005
239/431
3,263,934 A * 8/1966 Hope, Jr. ................ B05B 1/005
15/406
(Continued)

FOREIGN PATENT DOCUMENTS

DE 27 09 204 A1 9/1978
DE 33 41 786 A1 6/1985
(Continued)

OTHER PUBLICATIONS

Anonymous, "PID Controllers Explained", Control Notes Reflections of a Process Control Practitioner (Mar. 7, 2011), https://blog.opticontrols.com/archives/344, 2011, 18 pages.

*Primary Examiner* — T. Bennett Mckenzie
(74) *Attorney, Agent, or Firm* — Calderon Safran & Wright P.C.; David S. Safran

(57) ABSTRACT

A cleaning method for sectional cleaning of a filter having several filter sections, the filter sections being cleaned within a cleaning cycle in cleaning processes separated in time from one another, the cleaning method having at least two cleaning cycles and both a time interval between the cleaning processes within the respective cleaning cycle and also a time interval between the end of one of the cleaning cycles and the start of a following one of the cleaning cycles being changed. Moreover, a connecting device for connecting a filter to a cleaning device having a side wall, which borders an internal cross section, which increases along a longitudinal axis of the connecting device and has lateral openings
(Continued)

with assigned major axes and a method of connecting the connecting device to a filter device.

11 Claims, 10 Drawing Sheets

(51) Int. Cl.
    *B01D 46/10*     (2006.01)
    *B01D 46/56*     (2022.01)
    *B01D 46/58*     (2022.01)
    *B01D 46/71*     (2022.01)
    *B01D 46/42*     (2006.01)

(58) Field of Classification Search
    USPC ............ 55/282–305, 341.1–341.7, 361–382
    See application file for complete search history.

(56) References Cited

U.S. PATENT DOCUMENTS

| | | | |
|---|---|---|---|
| 3,429,106 A | | 2/1969 | Abboud |
| 3,665,547 A | * | 5/1972 | Boylan ............. B01D 46/2411 |
| | | | 15/406 |
| 3,891,418 A | * | 6/1975 | Burger ............. B01D 46/4281 |
| | | | 55/293 |
| 4,600,415 A | | 7/1986 | Barton |
| 5,019,142 A | * | 5/1991 | Waschkuttis ....... B01D 46/2474 |
| | | | 60/311 |
| 5,116,395 A | | 5/1992 | Williams |
| 5,361,452 A | | 11/1994 | Horn |
| 5,391,218 A | | 2/1995 | Jorgenson et al. |
| 5,505,763 A | * | 4/1996 | Reighard ............. B05B 14/43 |
| | | | 55/467 |
| 6,077,490 A | | 6/2000 | McIlroy et al. |
| 6,129,852 A | * | 10/2000 | Elliott ................. B01D 29/684 |
| | | | 210/791 |
| 7,485,163 B2 | | 2/2009 | Yoshimoto |
| 7,833,301 B2 | | 11/2010 | Schindler et al. |
| 8,894,744 B2 | | 11/2014 | Appelo et al. |
| 2003/0168101 A1 | | 9/2003 | Sulatisky et al. |
| 2004/0079231 A1 | * | 4/2004 | Green ................ B01D 46/4281 |
| | | | 95/280 |
| 2004/0188360 A1 | | 9/2004 | Armstrong et al. |
| 2006/0101794 A1 | * | 5/2006 | Gregoire ................ B01D 46/84 |
| | | | 55/282.3 |
| 2010/0275781 A1 | | 11/2010 | Tsangaris et al. |
| 2011/0185895 A1 | | 8/2011 | Freen |
| 2011/0271740 A1 | * | 11/2011 | Kondo ............... B01D 46/0086 |
| | | | 73/28.04 |
| 2013/0206008 A1 | * | 8/2013 | Szczap ................... B01D 46/71 |
| | | | 55/303 |
| 2013/0255485 A1 | | 10/2013 | Appelo et al. |
| 2014/0174476 A1 | | 6/2014 | Boatwright |
| 2015/0202558 A1 | | 7/2015 | Barker |
| 2015/0306532 A1 | | 10/2015 | Handte |
| 2015/0343361 A1 | | 12/2015 | Holzmann et al. |
| 2017/0312686 A1 | | 11/2017 | Archetti |
| 2019/0291035 A1 | | 9/2019 | Holzmann et al. |

FOREIGN PATENT DOCUMENTS

| | | |
|---|---|---|
| DE | 298 23 965 U1 | 1/2000 |
| EP | 0 796 645 A1 | 9/1997 |
| EP | 1 507 579 B1 | 1/2012 |
| EP | 2 602 016 A1 | 6/2013 |
| JP | 2003190727 A | 7/2003 |
| JP | 2008221106 A | 9/2008 |
| WO | 2007041955 A1 | 4/2007 |

\* cited by examiner

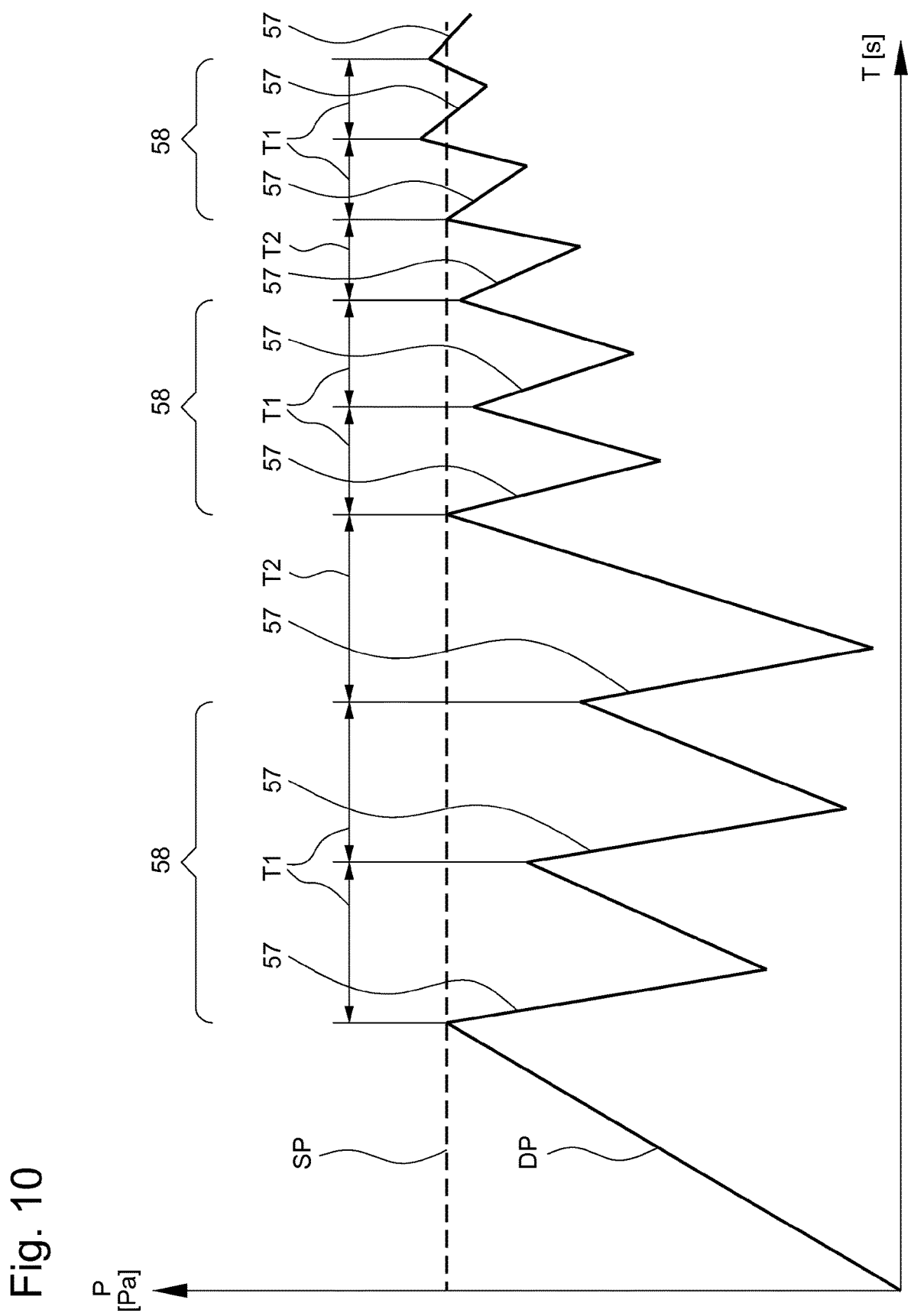

CLEANING METHOD, CONTROL APPARATUS AND CONNECTING DEVICE

CROSS-REFERENCE TO RELATED APPLICATIONS

This application is a divisional of commonly-owned, co-pending U.S. patent application Ser. No. 15/522,960 filed Oct. 24, 2017, which is a 371 of International Patent Application No. PCT/EP2015/073793 filed Oct. 14, 2015, which claims the benefit of priority to German Patent Application No. 20 2014 008 509.9 filed Oct. 28, 2014, and to European Patent Application No. 14003655.9 filed Oct. 28, 2014, the contents of which are incorporated herein by reference in their entirety.

BACKGROUND OF THE INVENTION

Field of the Invention

This invention relates to a cleaning method for cleaning of a filter in sections, a control apparatus for executing a cleaning method, a connecting device for connecting a filter to a cleaning device, a cleaning device for cleaning of a filter, a filter system with a filter, and an installation, in particular for coating processes, with an installation housing, a filter and a cleaning device for cleaning of the filter.

Description of Related Art

The term "cleaning method" in connection with this invention is defined in particular as all methods, procedures and processes by means of which the cleaning of a filter, of a filter system and/or of an installation before, during and/or after filtration by means of the filter is planned, analyzed, implemented, coordinated, adjusted and/or controlled.

Cleaning methods are necessary in many installations and/or filter systems in order to clean fouled or clogged filters. In current cleaning methods for sectional cleaning of a filter which has several filter sections, in particular filter cartridges, the filter sections are cleaned in cleaning processes separated from one another by fixed or constant time intervals. In doing so it can happen that the filter or one of the filter sections is being cleaned, although this is not yet necessary at the time of cleaning. In particular in such a cleaning method a filter cake which forms on the filter can be cleaned off or removed too early and/or too late by means of the cleaning. Accordingly additional and avoidable costs are also associated with such a cleaning method.

The term "connecting device" in this invention is preferably a structural apparatus, in particular for filter systems, cleaning devices and/or installations, for example as an adapter or intermediate piece which is preferably made to fluidically connect a filter to a cleaning device. In particular a connecting device is made to direct a medium, in particular a fluid of the cleaning device, to the filter which is preferably connected to the cleaning device.

The term "cleaning device" in this invention is defined preferably as a device which is made to clean an assigned filter, preferably pneumatically and/or by means of compressed air, preferably particles in or on the filter and/or a filter cake of the filter which has formed or is forming on the filter being removed partially or completely from the filter. Especially preferably cleaning devices generate a pressure pulse, in particular at least essentially against that flow direction which prevails in the filter during filtration by means of the filter. Cleaning devices are used both during continuing operation of the filter or of the filter system (online operating mode) and also when the operation of the filter or of the filter system is being interrupted (offline operating mode).

The term "filter system" in this invention is defined preferably as a system which has at least one filter and at least one cleaning device for cleaning of the filter. The filter of a filter system is preferably made to remove and/or filter solids/particles of a fluid from the fluid within the scope of filtration. In particular the separation of the particles of the fluid to be cleaned takes place by a filter medium of the filter, within the filter medium and/or by means of a filter cake which has formed or is forming on the filter medium. According to this definition filters are especially surface filters, such as filter cartridges or filter hoses which are made in particular to separate particles of a gas or raw gas by means of cake filtration and/or depth filtration.

The term "installation" in this invention is defined in particular as industrial installations and/or process-engineering installations. In this invention they are preferably coating installations for coating of a product with a layer. In particular installations according to this definition are made to coat pharmaceutical products such as pellets. Preferably the coating takes place by means of fluidized bed processes, in particular the product to be coated being fluidized as a fluidized bed. Preferably installations according to this definition have a filter system with a filter and a cleaning device for cleaning of the filter, in particular to separate particles such as dust from a raw gas during the coating process and/or to supply them again to the coating process.

Cleaning devices are necessary in many methods to clean fouled or clogged filters. Current cleaning devices, filter systems and/or installations have cleaning devices which are spaced apart from assigned filters such that during filtration the cleaned medium or the clean gas can escape from the filter, in particular from the filter outlet of the filter. German Utility Model DE 298 23 965 U1 and European Patent EP 1 507 579 B1 disclose compressed air pulse injector systems which for cleaning and regeneration of individual filter cartridges by means of compressed air are located and spaced above the filter and for cleaning purposes blow compressed air first into the space surrounding the compressed air pulse injector systems and then into the respective filter cartridge. Based on the distance between the outlet of the cleaning device and the filter cartridge to be cleaned at the time, high flow losses arise which can lead to the respective filter cartridges, in particular in the neck region, not being completely cleaned and/or having to be cleaned very often and/or repeatedly.

SUMMARY OF THE INVENTION

The object of this invention is to devise a cleaning method for cleaning of a filter as well as a control apparatus for executing a cleaning method for cleaning of a filter which enables or supports improved, reliable, efficient and/or economical cleaning of the filter and/or filtration by means of the filter and/or which minimizes the number of cleaning processes. Furthermore the object of this invention is to devise a connecting device in particular for connecting a filter to a cleaning device, a cleaning device, a filter system and an installation, as a result of which a compact construction and/or reliable, efficient, economical, low-maintenance and/or low-loss cleaning of the filter and/or of a filter section of the filter is enabled or supported.

This object is achieved by a cleaning method, a control apparatus, a connecting device, a cleaning device, a filter system, and an installation as disclosed herein.

One aspect of this invention lies in that the filter sections are cleaned within one cleaning cycle in cleaning processes which are separated in time from one another and the cleaning method has at least two cleaning cycles, both a time interval between the cleaning processes within the respective cleaning cycle and also a time interval between the end of one of the cleaning cycles and the start of a following one of the cleaning cycles being changed. In this way, it is possible to reduce the number of necessary cleaning processes overall, to leave a filter cake as long as possible on the filter sections and/or to optimize and/or change the time or the time interval between the cleaning processes within the respective cleaning cycle as well as the time interval between the end of one of the cleaning cycles and the start of a following one of the cleaning cycles such that the cleaning method cleans the filter altogether more reliably, efficiently and/or economically.

According to another independently attainable aspect of this invention the filter has at least three filter sections, the filter sections being cleaned in cleaning processes separated by time intervals from one another and the time intervals between successive cleaning processes being changed. The already explained advantages can be achieved in this way.

Preferably, the time intervals between the cleaning processes within the respective cleaning cycle and also the time intervals between the end of one of the cleaning cycles and the start of a following one of the cleaning cycles is changed by means of feedback control. This enables preferably complete automation of the suggested cleaning method, in particular reliable, efficient and/or economical cleaning of the filter and/or filtration by means of the filter being achieved.

Especially preferably, the feedback control adjusts a differential pressure between a filter inlet and a filter outlet of the filter and/or a differential pressure between a filter inlet and a filter outlet is used as the controlled variable in the feedback control. This advantageously makes it possible to change the time intervals depending on the differential pressure by means of the feedback control.

In one especially preferred version of the suggested cleaning method, the differential pressure or the system deviation is filtered with a control filter, preferably with a low-pass characteristic and/or such that peaks and/or fluctuations of the differential pressure caused by one or more cleaning processes are at least essentially suppressed and/or filtered. This ensures that the cleaning method is steady and/or stable.

Especially preferably, the time intervals between the cleaning processes within one cleaning cycle are constant and/or are kept at a constant value. In this way the complexity of the cleaning method is reduced and the number of possible fault sources is minimized.

One suggested control apparatus is made to execute the suggested cleaning method, preferably the control apparatus being made to determine using at least one pressure sensor a differential pressure between a filter inlet and a filter outlet of the filter, and/or to trigger a valve to initiate a cleaning process. In this way the already explained advantages can likewise be achieved.

Another also independently attainable aspect of this invention lies in that a connecting device has a side wall which delimits an internal cross section which increases along a longitudinal axis of the connecting device and has openings laterally with assigned major axes, the major axes of the openings running obliquely to the side wall and pointing from outside to inside in the direction of one internal cross section which is greater than an internal cross section into which the respective opening discharges. In this way, the suggested connecting device enables a direct connection of the filter to the cleaning device and/or a support of the cleaning device both during the cleaning and also during the filtration.

In particular, the medium with which the filter is being cleaned travels during and/or for cleaning from the cleaning device via the connecting device directly to the filter, while the medium cleaned by means of the filter or the clean gas can escape from the filter through the openings of the connecting devices from the inside to the outside. Consequently it is not necessary to replace, change or spatially move the connecting device for the respective operation of the filter.

The openings which run obliquely to the side wall preferably reduce flow losses both during cleaning and also during filtration.

The manner of construction of the connecting device, preferably and advantageously, increases the mass flow and/or the pressure of the medium with which the filter is being cleaned and/or reduces the risk of possible flow detachment on the side wall of the connecting device during cleaning.

According to another also independently attainable aspect of this invention, the openings of the connecting device are oriented at one or more planes which is or are aligned orthogonally to the longitudinal axis of the connecting device. This ensures economical production of the connecting device and enables the side wall of the connecting device to be provided with as many openings as possible, in particular without the connecting device losing stability.

According to another also independently attainable aspect of this invention, the side wall has a section free of openings in the region of the greatest internal cross section. In this way the flow losses during cleaning are reduced and/or a pressure rise by means of the connecting device is enabled during cleaning, in particular without the medium with which the filter is being cleaned flowing from the inside to the outside through the openings of the connecting devices and which would thus not contributing to the cleaning of the filter.

A suggested cleaning device for cleaning of a filter preferably has the suggested connecting device in order to connect the filter to the cleaning device. In this way the already explained advantages can be achieved.

A suggested filter system with a filter and a cleaning device for cleaning of the filter preferably has the suggested connecting device for connection of the filter to the cleaning device. In this way the already explained advantages can likewise be achieved.

A suggested installation, in particular for coating processes, with an installation housing, a filter and a cleaning device for cleaning of the filter preferably has the suggested connecting device. In this way the already explained advantages can likewise be achieved.

According to another also independently attainable aspect of this invention, the installation has an installation housing which in the interior has a storage apparatus which is made to supply the cleaning device with a medium with which the filter is being cleaned, in particular compressed air. This reduces the distance between the cleaning device and a storage apparatus which is located outside the installation housing. Along with this, the flow losses of the cleaning device are reduced and/or the existing construction space in the installation housing is efficiently used and/or a compact installation is enabled.

According to another also independently attainable aspect of this invention, the installation housing internally has a valve for initiating a cleaning process. This likewise enables optimized use of the construction space in the installation housing and prompt control and/or adjustment of the cleaning. The valve preferably connects the storage apparatus to the connecting device, in particular fluidically and/or on one end facing away from the filter or end with reduced internal cross section of the connecting device.

The aforementioned aspects and other aspects and features arising from the claims and following description can be implemented independently of one another and in any combination.

Other advantages, features, properties and aspects of this invention will be apparent from the following description of preferred embodiments with reference to the accompanying drawings.

BRIEF DESCRIPTION OF THE DRAWINGS

FIG. 10 shows a schematic of the pressure as a function of time in the suggested cleaning method according to a second version of the method.

DETAILED DESCRIPTION OF THE INVENTION

In the figures, which are only schematic and partially not to scale, the same reference numbers are used for the same or similar parts, corresponding or comparable properties and advantages being attainable even if a repeated description is omitted.

Figure 1:
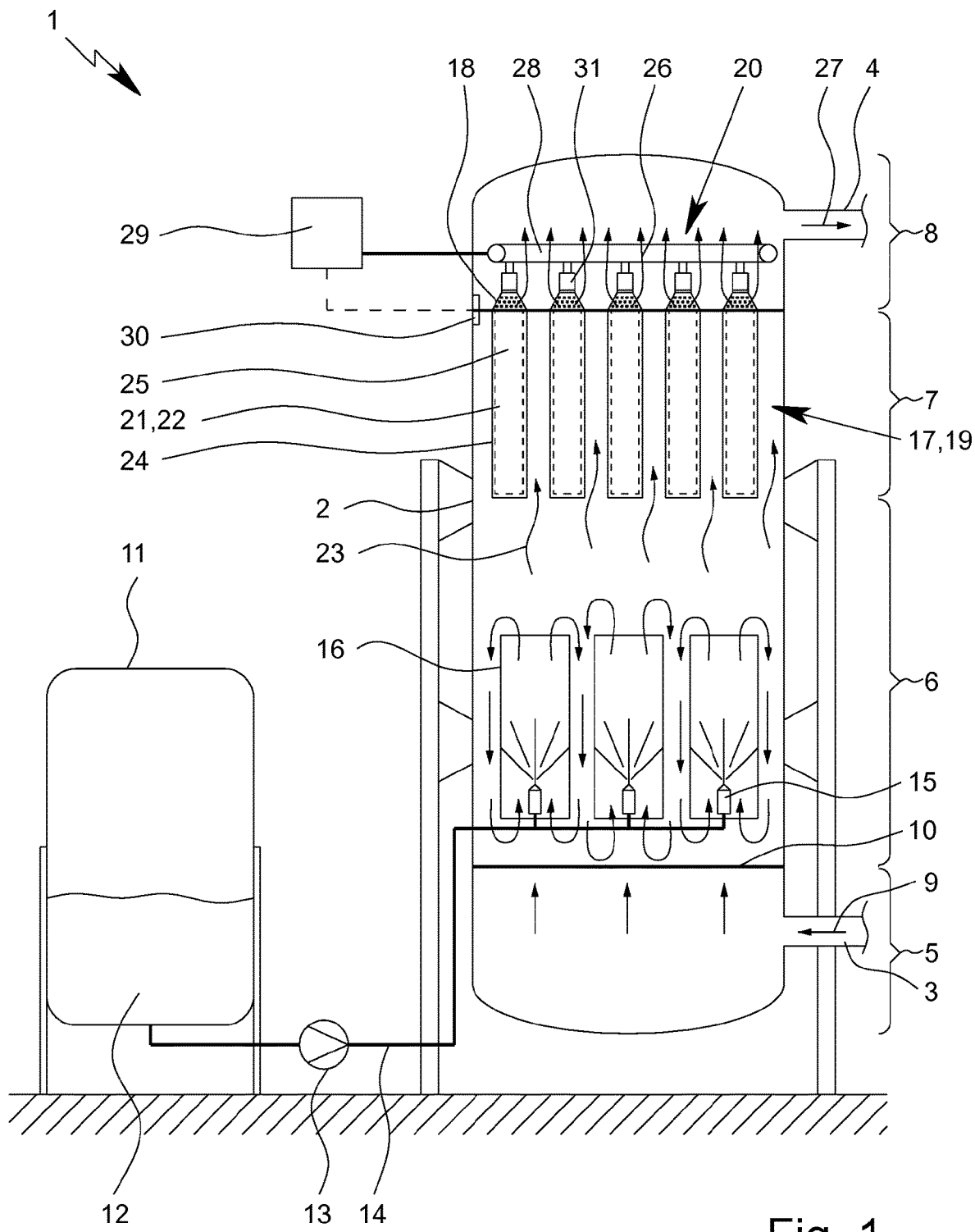
FIG. 1 shows a schematic section of a suggested installation with a suggested filter system, a suggested connecting device and a suggested cleaning device.

The installation 1 shown in FIG. 1 is preferably made to carry out coating processes. In particular, the installation 1 is a fluidized bed coating installation for the production of pellets (not shown) and/or for pelletizing within the scope of preferably pharmaceutical production.

The installation 1 preferably has an installation housing 2 with a housing inlet 3 and a housing outlet 4.

Preferably the installation housing 2 is made as a reactor. Especially preferably the pelletizing and/or coating/production of the pellets takes place within the installation housing 2.

Preferably, the installation housing 2 is and/or can be divided into an inlet air region 5, spray region 6, filter region 7 and dome region/clean gas region 8.

The housing inlet 3 is preferably fluidically connected to an inlet air system (not shown) which is made to supply the installation 1 and/or the installation housing 2, in particular the inlet air region 5, with inlet air 9, in particular the inlet air 9 being conditioned by means of the inlet air system for the coating.

Preferably, the inlet air region 5 is separated from the spray region 6 by means of a perforated bottom 10. In particular, the inlet air 9 is directed or guided through the perforated bottom 10 from the inlet air region 5 into the spray region 6.

The installation 1 preferably has a suspension tank 11 which contains a suspension 12 or another fluid for the coating process in the interior.

The suspension 12 is preferably supplied to the installation housing 2 by means of a suspension pump 13 via a suspension line 14 and/or pumped into the installation housing 2.

Preferably in the spray region 6 there are one or more nozzles 15 which are made to atomize the suspension 12 in the installation housing 2, in particular in the spray region 6, and/or to apply the suspension 12 to the pellets (not shown), preferably the pellets being fluidized within the scope of the fluidized bed coating process and/or moving as a fluidized bed in the spray region 6.

Preferably, the nozzles 15 are each located in a pipe, in particular in a Wurster pipe 16.

The pellets are preferably routed past the nozzles 15 in the Wurster pipe 16 and sprayed and/or coated with the suspension 12 by means of the nozzles 15. Preferably the pellets in the Wurster pipe 16 are routed or blown upward and/or against gravity by means of the inlet air 9.

Outside the Wurster pipes 16, the pellets drop preferably in the direction of the perforated bottom 10 and/or with gravity downward. In this way the pellets are coated along an at least essentially ellipsoidal path in the installation housing 2.

The illustrated embodiment is in particular a bottom spray version, preferably the nozzles 15 pointing up. But other embodiments or arrangements in the installation 1 and/or in the installation housing 2 are also possible.

There is preferably a suggested filter system 17 in the filter region 7.

The filter system 17 preferably has a connecting device 18 which is made to connect a filter 19 assigned to the filter system 17 to a cleaning device 20 which is likewise assigned to the filter system 17. The connecting device 18 can be part of the filter 19 or of the cleaning device 20 or connected hereto and/or can be implemented separately.

The filter 19, preferably a particle filter, is preferably located within the installation housing 2, in particular above the spray region 6 and/or in the filter region 7 and/or in the region of the housing outlet 4. But other arrangements and/or designs are also possible.

The filter 19 preferably separates the spray region 6 from the dome region 8, in particular in a gas-permeable and/or particle-retaining manner.

Preferably, the filter 19 has several filter sections 21 and/or is and/or can be divided into several filter sections 21.

Especially preferably the filter sections 21 are spaced apart from one another and/or are made as separate units of the filter 19.

The filter sections 21 are quite especially preferably made as elongated, tubular and/or cylindrical surface filters, in particular as filter cartridges 22, which project preferably from the dome region 8 into the filter region 7.

Preferably, a medium to be filtered, in particular a raw gas 23, flows through the filter cartridge 22 during the filtration by means of the filter 19 from the outside to the inside, as shown in FIG. 1.

In particular, the surface of the filter section 21 or of the filter cartridge 22 is made as the filter inlet 24 and the inside of the filter section 21 or of the filter cartridge 22 indicated by broken lines is made as the filter outlet 25.

The medium, in particular a clean gas 26, which is cleaned or filtered by means of the filter 19, is preferably routed into the dome region 8 of the installation housing 2 preferably by means of the connecting device 18 in order to subsequently leave the installation housing 2 via the housing outlet 4 as exhaust air 27.

In particular, that part of the suspension 12 which does not adhere to the pellets is carried preferably as dust, in particular as a suspension dust or raw gas 23, from the spray region 6 into the filter region 7.

The filter 19 is made in particular to filter the dust-laden air or raw gas 23 and then to direct it as clean gas 26—preferably, by means of the connecting device 18—into the dome region 8 and/or to the housing outlet 4.

Preferably, the filter 19 and/or individual filter sections 21 clogs increasingly with particles, in particular the suspension dust, during filtration of the raw gas 23.

The cleaning device 20 is preferably made to clean the filter 19. In particular the cleaning device 20 is made to remove the dust of the suspension 12 or other particles from the filter 19 and/or from the filter surface and/or to convey it, in particular blow it, from the filter region 7 into the spray region 6. In FIG. 1 the cleaning device 20 is not active or no cleaning is taking place.

Especially preferably, the cleaning device 20 is located at least partially or completely in the installation 1, in particular in the installation housing 2. In the illustrated arrangement, the cleaning device 20 is located in the dome region 8 and/or on the clean gas side and/or above the filter 19 and/or individual filter sections 21. But other arrangements are also possible.

The cleaning device 20 preferably has a storage apparatus 28, in particular the storage apparatus 28 being made to supply the cleaning device 20 with a medium, in particular compressed air.

Preferably, the storage apparatus 28 is located at least partially, preferably completely, within the installation housing 2. The storage apparatus 28 is especially preferably located in the dome region 8 and/or above the filter 19.

Preferably, the installation 1, the filter system 17 and/or the cleaning device 20 has or have a control apparatus 29. The control apparatus 29 is made in particular to control or regulate the cleaning device 20 and/or the cleaning of the filter 19.

In the illustrated embodiment, the control apparatus 29 is located preferably outside the installation housing 2. But other arrangements are also possible.

Preferably, the installation 1, the filter system 17, the cleaning device 20 and/or the control apparatus 29 has or have at least one pressure sensor 30, in particular the pressure sensor 30 being made to determine and/or measure a differential pressure DP.

The differential pressure DP is preferably the difference between two static pressures, dynamic pressures, or total pressures of a fluid. In particular the differential pressure DP is the difference of the, preferably static, pressure of the raw gas 23 and of the, preferably static, pressure of the clean gas 26.

Preferably, the differential pressure DP is determined and/or measured between the filter inlet 24 and the filter outlet 25, between the dome region 8 and one of the other regions of the installation housing 2 and/or between the housing inlet 3 and housing outlet 4 by means of the pressure sensor 30.

Preferably, the control apparatus 29 controls or regulates a valve 31 which is assigned in particular to the cleaning device 20 and/or the filter system 17 depending on the differential pressure DP and/or according to the suggested cleaning method.

In particular, a respective valve 31 is assigned to each filter section 21 or to each filter cartridge 22 and/or one filter section 21 or a respective filter cartridge 22 is fluidically connected to a valve 31, especially preferably by means of the respective connecting device 18. But, other designs are also possible, in particular in which a valve 31 is fluidically connected to several filter sections 21.

Especially preferably, the installation 1, the filter system 17, the cleaning device 20 and/or the control apparatus 29 is or are made to determine and/or measure the differential pressure DP with one or more pressure sensors 30 and/or to trigger the valve or valves 31 to clean the filter 19.

Preferably, the installation 1, the filter system 17, the cleaning device 20 and/or the control apparatus 29 is or are made to carry out a suggested cleaning method which is explained later in the description.

By filtering the raw gas 23, with time, a dust layer, in particular, a filter cake 32, forms on the surface of the filter 19, in particular of the filter sections 21.

Preferably, the mass or the volume, in particular the thickness, and/or the density of the filter cake 32 increases during the filtration and/or during operation of the installation 1.

In particular, with or by the increase of the mass, of the volume, and/or of the density of the filter cake 32, the differential pressure DP likewise rises.

Preferably, the differential pressure DP is at least essentially a function of the mass, of the volume, and/or of the density of the filter cake 32 and/or the differential pressure DP correlates, in particular positively, with the mass, the volume and/or the density of the filter cake 32.

In particular, when the differential pressure DP reaches, exceeds or approaches a given value, the control apparatus 29 controls or adjusts the valve or valves 31 preferably such that the valve or valves 31 open and/or compressed air or some other medium is blown or directed out of the storage apparatus 28 through the valves or valves 31 and/or through the connecting device 18 into the filter 19 and/or into one of the filter sections 21.

Preferably, the differential pressure DP drops by and/or during the cleaning of the filter 19 and/or of one of the filter sections 21.

In the following, the suggested connecting device 18 is first described isolated using FIG. 2 and then in the installed state using FIG. 3 and FIG. 4.

Figure 2:
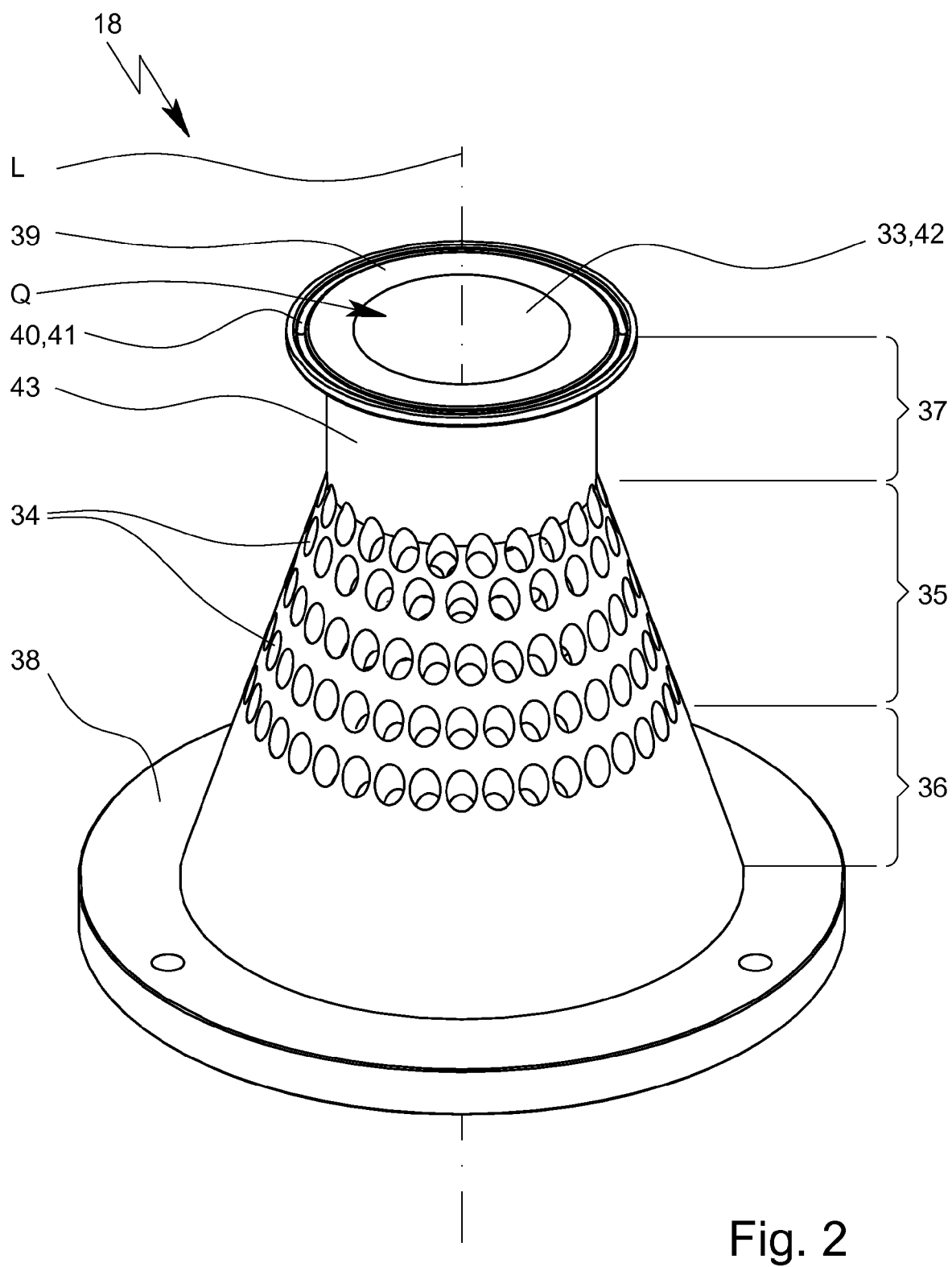
FIG. 2 shows a perspective view of a suggested connecting device.

FIG. 2 shows a perspective view of the connecting device 18.

Preferably, the connecting device 18 is made to connect the filter 19 to the cleaning device 20 (see, FIGS. 3-5), the connecting device 18 having one side wall 33 which delimits an internal cross section Q which increases along a longitudinal axis L and has openings 34 with assigned major axes H.

The connecting device 18 preferably has at least two, in particular at least 50, especially preferably at least 100, and/or at most 1000, especially at most 500, quite especially preferably at most 400 openings 34.

Preferably, the connecting device 18 is or can be divided into at least two, preferably three regions or sections.

Preferably, the openings 34 are located in a first section 35 of the connecting device 18.

Especially preferably, the connecting device 18 has a second section 36 free of openings. In particular the second section 36 is free of openings and/or is closed laterally along the longitudinal axis L. The second section 36 preferably directly and/or continuously borders the first section 35 and/or forms with it an interruption-free or continuous flow wall.

In particular, the second section 36 has the internal cross section Q which increases along the longitudinal axis L and/or the greatest internal cross section Q1 at least in part.

Preferably, each internal cross section Q of the second section 36 is greater than one of the internal cross sections Q of the first section 35.

The second section 36 extends preferably to at least 10%, especially preferably to at least 20%, in particular to at least 30% and/or to at most 70%, especially preferably to at most 60%, in particular to at most 50%, of the length or height of the connecting device 18.

The connecting device 18 and/or the side wall 33 has or have preferably a third section 37, preferably the third section 37 having a constant, in particular cylindrical internal cross section Q. The third section 37 preferably directly borders the first section 35, preferably on one side of the first section 35 facing away from the second section 36.

The first section 35, the second section 36 and/or the third section 37 are preferably tightly connected or made integral.

Preferably, the internal cross section Q of the third section 37 is smaller than the internal cross section Q of the second section 36 and/or smaller than or equal to the preferably smallest internal cross section Q2 of the first section 35. In particular, the internal cross section Q of the third section 37 is the smallest internal cross section Q2 of the connecting device 18.

In particular, the first section 35 and/or the third section 37 has or have the smallest internal cross section Q2 of the connecting device 18.

Preferably, a width or a diameter of the smallest internal cross section Q2 is greater than 33 mm and/or smaller than 70 mm, preferably at least essentially equal to 50.8 mm (2 inches), and/or a width or a diameter of the smallest internal cross section Q2 is more than 20%, preferably more than 30%, and/or less than 60%, preferably less than 50%, of a diameter or a width of the greatest internal cross section Q1 of the connecting device 18.

Especially preferably, the ratio of the surface of the filter section 21 assigned to the connecting device 18 and/or of the filter cartridge 22 assigned to the connecting device 18 to the smallest internal cross section Q2 and/or to the internal cross section Q2 of the connecting device 18 bordering the cleaning device 20 is an, especially dimensionless, characteristic number K.

The characteristic number K can preferably be computed or expressed via the following formula:

$$K = A_{Filter}/Q = d_{Filter} * L_{Filter} * 4/d_Q^2,$$

Preferably in the formula, an at least essentially cylindrical filter section 21 being assumed, and/or $A_{Filter}$ being the surface of the filter section 21 assigned to the connecting device 18 and/or of the filter cartridge 22 assigned to the connecting device 18, Q being the smallest internal cross section Q2, $d_{Filter}$ being the inside or outside diameter of the filter section 21 and/or of the filter cartridge 22, $L_{Filter}$ being the length or height of the filter section 21 and/or of the filter cartridge 22 and $d_Q$ being the diameter or the width of the smallest internal cross section Q2 and/or of the internal cross section Q2 bordering the cleaning device 20. The characteristic number K can be computed accordingly for different filter geometries.

Preferably, the ratio of the surface of the filter section 21 assigned to the connecting device 18 and/or of the filter cartridge 22 assigned to the connecting device 18 to the smallest internal cross section Q2 of the connecting device 18 and/or of the internal cross section Q2 bordering the cleaning device 20, and/or the characteristic number K is greater than 200, in particular greater than 250, and/or less than 3000, in particular less than 2500.

The internal cross section Q is preferably a (maximum) internal cross sectional area perpendicular to the longitudinal axis L of the connecting device 18 or a hydraulic cross section or a hydraulic cross sectional area. In particular the internal cross section Q is the area enclosed or delimited by the side wall 33 of the connecting device 18.

Preferably, on at least one axial end and/or in the opening or mouth region the connecting device 18 has at least one connecting apparatus, in particular a flange union 38 and/or a clamp union 39, in particular the connecting apparatus being made to connect the connecting device 18 to the filter 19 and/or the cleaning device 20, the valve 31 and/or the storage apparatus 28 by form-fit, force-fit and/or by bonding.

The connecting device 18, in particular the connecting apparatus of the connecting device 18, is/are made preferably to connect the connecting device 18 to the filter 19, the connecting device 18 to the cleaning device 20, and/or the filter 19 to the cleaning device 20, especially in an immovable, holding, supporting and/or rigid manner.

Especially preferably, the connecting device 18 has a respective connecting apparatus on each of the two axial ends, as shown in FIG. 2.

The connecting apparatus is/are preferably made as a flange, clamp connection and/or screwed pipe joint and/or are located on opposite axial ends of the connecting device 18, in particular are formed integrally therewith.

In the embodiment shown in FIG. 2, the connecting device 18—preferably on the axial end of the second section 36—has a flange union 38 and—preferably on the axial end of the third section 37—a clamp union 39. However, other designs are also possible, in particular, in which both axial ends of the connecting device 18 have a flange union 38 or clamp union 39 as connecting apparatus.

The connecting apparatus or connecting apparatuses can be made as groove unions or collar unions. In the illustrated embodiment the flange union 38 is made preferably as a collar union and the clamp union 39 is made preferably as a groove union.

Preferably, the connecting apparatus has a groove 40, preferably the groove 40 being made to hold a seal 41.

The outside diameter of the connecting apparatus is preferably larger than the outside diameter of the bordering section of the connecting device 18. In particular the outside diameter of the flange union 38 is greater than the maximum or bordering outside diameter of the second section 36 and/or the outside diameter of the clamp union 39 is greater than the maximum or bordering outside diameter of the first section 35 and/or of the third section 37.

As shown in FIG. 2, the internal cross section Q of the connecting device 18 is made at least essentially circular. But other designs are also possible, in particular in which the internal cross section Q is made at least oval, rectangular or square.

The connecting device 18 and/or the side wall 33 preferably delimits the internal cross section Q with one inside 42 of the side wall 33.

Preferably, the inside 42 runs conically along the longitudinal axis L—at least in the first section 35 and/or in the second section 36—and/or has an at least essentially straight contour. Alternatively or additionally, the inside 42 is shaped bell-like, is bell-shaped or in the form of a diverging Laval nozzle section. Preferably, the inside 42 of the side wall 33 is made at least essentially concave and/or convex.

In the illustrated embodiment the internal cross section and/or the slope of the internal cross section Q and/or of the inside 42 decreases along the longitudinal axis L or an angle enclosed between the longitudinal axis L and a tangent of the side wall 33 decreases. In particular, the first section 35 has an internal cross section Q which increases more dramatically along the longitudinal axis L than the second section 36.

Preferably, the connecting device 18, in particular the side wall 33, has an outside 43, and preferably the profile or the contour of the outside 43 can be made independent of the inside 42.

Preferably, the outside 43 has an external cross section A which increases along the longitudinal axis L. In the illustrated embodiment the outside 43 runs along the longitudinal axis L at least essentially parallel to the inside 42. But other solutions are also possible.

In particular, the outside 43—at least in the first section 35 and/or second section 36—is at least essentially straight and/or the outside 43 has an at least essentially conical contour or one which is arched in the longitudinal direction or is bell-like. But other designs are also possible here.

Figure 3:
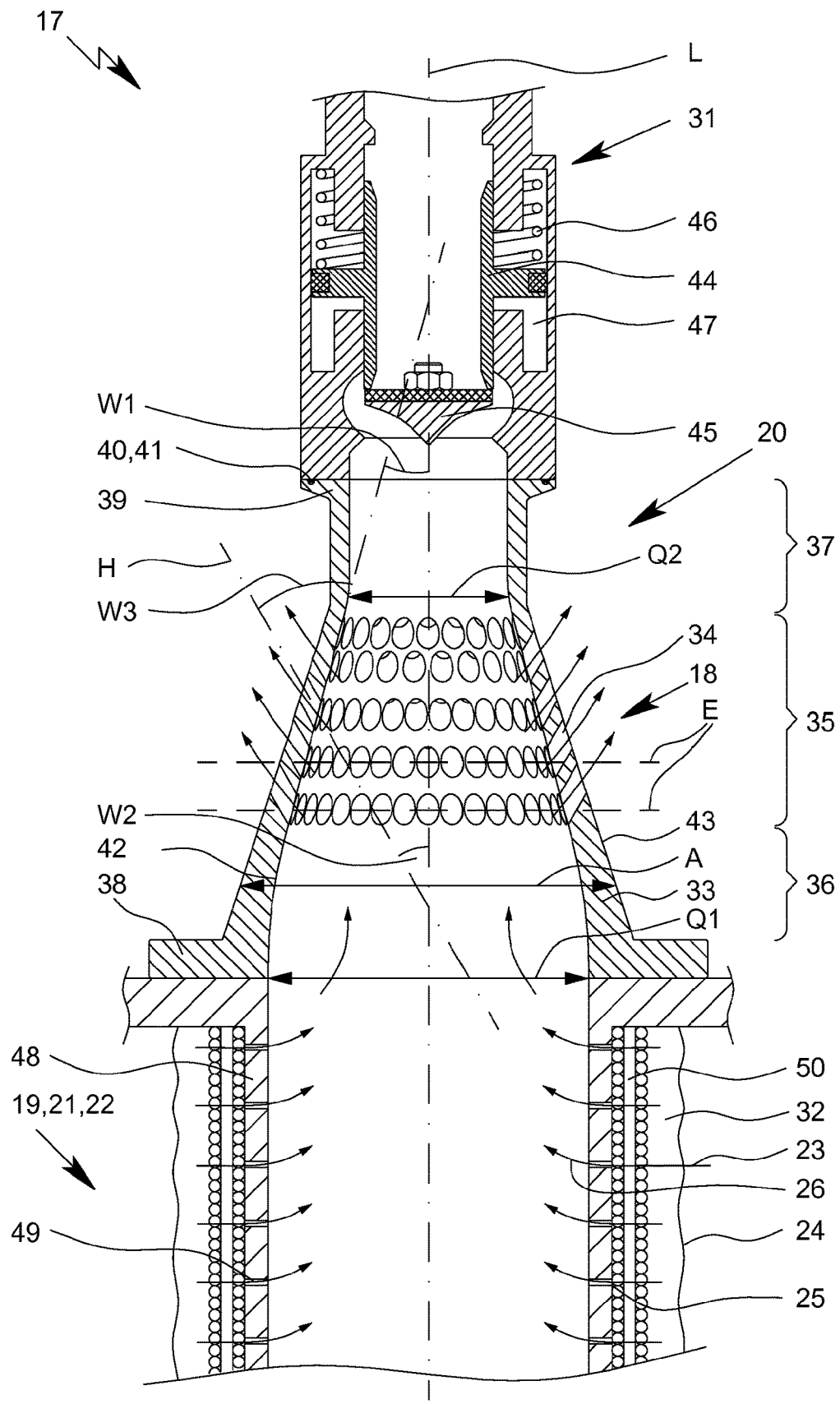
FIG. 3 shows a schematic section of a suggested filter system with the connecting device, a valve in the closed state and a section of the filter.

FIG. 3 shows a schematic section of the connecting device 18 together with the valve 31 in the closed state and with one part of one of the filter sections 21.

The transition between the first section 35 and second section 36 and/or between the second section 36 and third section 37 is/are preferably at least essentially continuous. Especially preferably, the inside 42 at least in the first section 36 and/or in the second section 37 is made continuous.

In the illustrated embodiment, the outside 43—at least in the first section 35 and in the second section 36—is made straight and/or conical. But other designs are also possible here.

Preferably, the thickness of the side wall 33 and/or the difference between the internal cross section Q and the external cross section A increases along the longitudinal axis L and/or with increasing internal cross section Q.

In particular, the internal cross section Q increases along the longitudinal axis L with a first angle W1 which is greater than 5° and/or less than 20°, preferably at least essentially is equal to 12°, in particular an imaginary extension or tangent of the inside 42 including the first angle W1 with the longitudinal axis L.

As shown in FIG. 3, the major axes H of the openings 34 run obliquely to the side wall 33, in particular to the inside 42 of the side wall 33. For purposes of illustration FIG. 3 shows only the major axis H of one opening 34. The following explanations however apply preferably to the major axes H of the other openings 34 accordingly.

Preferably, the major axes H point from the outside to the inside in the direction of an internal cross section Q which is greater than an internal cross section Q into which the respective opening 34 discharges.

Especially preferably, the major axes H point from the outside to the inside in the direction of greatest internal cross section Q1 and/or intersect a plane imagined through the greatest internal cross section Q1. In particular the major axes H point from the outside to the inside in the direction of the filter 19, as shown in FIG. 3.

Especially preferably, the major axes H of the openings 34 intersect the longitudinal axis L at a second angle W2 and/or the major axes H with the longitudinal axis L in a longitudinal sectional view of the connecting device 18, as shown in FIG. 3, include a second angle W2, preferably the second angle W2 being less than 90°, preferably at least essentially equal to 45°.

Preferably, the inside 42 includes with the major axis H, in particular in the region of the respective mouth of the opening 34, a third angle W3, in particular preferably the third angle W3 being less than 90° and/or greater than the first angle W1 and/or the second angle W2.

The openings 34 are preferably oriented and/or located in one or more planes E, in particular the planes E being aligned at least essentially orthogonally to the longitudinal axis L of the connecting device 18, as illustrated in FIG. 3 using two planes E.

Preferably, the planes E are each defined by at least three openings 34. In particular at least three openings 34 lie and/or discharge in one of the planes E.

Especially preferably, each opening 34 is or can be assigned to one of the planes E.

As shown in FIG. 3, the planes E along the longitudinal axis L are arranged—preferably at least essentially equidistantly—offset to one another and/or parallel to one another. But other designs or arrangements are also possible.

The number of openings 34 per plane E increases preferably with increasing internal cross section Q along the longitudinal axis L.

Especially preferably, the ratio of all cross sections of the openings 34 of one plane E to the internal cross section Q into which the openings 34 of the plane E discharge remains constant at least essentially along the longitudinal axis L.

The openings 34—at least along the internal cross section Q into which the respective openings 34 discharge, and/or in a plane E—are arranged at least essentially circularly and/or form several concentric circles along the longitudinal axis L.

In one alternative which is not shown the openings 34 alternatively or additionally are arranged in a latticed manner or form a latticed structure.

The major axes H of the openings 34 of one of the planes E preferably have one common intersection point, in particular the intersection point lying on the longitudinal axis L.

The openings 34 are arranged uniformly distributed preferably along the longitudinal axis L—at least in the first section 35—and/or over the respective internal cross section Q. Preferably the openings 34 in the respective plane E are equidistantly offset to one another and/or arranged rotationally symmetrically to one another.

In the embodiment shown in FIG. 3, the openings 34 are made as a hole and/or have a circular cross section. But other geometries are also possible, in particular the openings 34 having an angular, in particular rectangular cross section and/or being made as a slot, cylindrical, rotationally symmetrical and/or axially symmetrical to the respective major axis H.

Preferably, the openings 34 have a diameter and/or a width which is more than 2% and/or less than 20%, preferably at least essentially equal to 10% of the diameter and/or of the width of the greatest internal cross section Q1.

In the illustrated embodiment, the openings 34 each have at least essentially the same diameter and/or the same width. But other designs are also possible, in particular in which the diameter and/or the width of each of the openings 34 and/or in one plane E and/or along the longitudinal axis L varies.

Preferably, the openings 34 have a diameter and/or a width of at least 5 mm and/or at most 40 mm, in particular of at least essentially 20 mm.

The cross section of the mouths or the cross sectional area of all openings 34 is together or cumulated preferably more than 2% or 5%, in particular more than 8% or 10%, especially preferably more than 12%, and/or less than 50% or 40%, in particular less than 30% or 20%, quite especially preferably less than 15%, of the area of the inside 42 and/or outside 43.

The openings 34 are preferably made elongated and/or tubular, preferably with a length which is greater than the diameter and/or the width of the openings 34.

Preferably, the internal cross section Q tapers in the direction of the cleaning device 20 and/or of the valve 31 and/or increases in the direction of the filter 19 and/or of the filter sections 21.

The suggested cleaning device 20 preferably has the connecting device 18 and/or is or can be connected to it. In particular the valve 31 which is preferably assigned to the cleaning device 20 and/or is an integral part of the cleaning device 20, is fluidically connected to the connecting device 18, as shown in FIG. 3.

The valve 31 is preferably made as an axial valve, as shown, for example, in FIG. 3. But other designs are also possible.

Preferably, the valve 31 is or can be driven pneumatically, hydraulically and/or electrically. In the illustrated embodiment the valve 31 is preferably driven pneumatically, in particular by means of compressed air of the storage apparatus 28 (not shown).

The valve 31 preferably has a piston 44, preferably the piston 44 being movable axially and/or in the direction of the longitudinal axis L.

In FIG. 3, the valve 31 is in the closed state.

In the closed state, the piston 44 rests or lies on a cone seat 45 located in the valve 31 such that flow through the valve 31 is prevented.

Preferably, the piston 44 is pre-tensioned by means of a spring 46 or some other tensioning element. To open the valve 31, the valve 31 preferably has a valve chamber 47. In particular, the pressure of a medium in the valve chamber 47 is or can be adjusted or controlled by means of the control apparatus 29 (not shown).

Preferably, the valve 31 opens when the pressure in the valve chamber 47 is greater than the pressure produced by the spring 46.

The filter 19 shown in FIG. 3 or one of the filter sections 21 of the filter 19 preferably has one manifold 48 with several holes 49. The manifold 48 is jacketed in particular by a filter cloth 50.

The filter cloth 50 is preferably made to retain or filter particles of a certain size, in particular the initially described suspension dust.

Preferably, during and/or by the filtration, as indicated in FIG. 3, the filter cake 32 forms on the manifold 48 and/or the filter cloth 50.

The arrows shown in FIG. 3 schematically illustrate the preferred flow direction in the filter 19 and in the connecting device 18 during filtration by means of the filter 19. The arrows illustrate only schematically the flow direction; any turbulence, eddies, detachments and/or other flow phenomena remain ignored.

In filtration by means of the filter 19, the medium to be cleaned, in particular the raw gas 23, flows through the filter section 21 at least essentially from the outside to the inside and/or in the radial direction to the longitudinal axis L.

Flow through the connecting device 18 takes place during filtration by means of the filter 19 in the second section 36 preferably at least essentially axially and/or along the longitudinal axis L.

Subsequently or downstream, the flow in the first section 35 during filtration is diverted such that it flows from the inside to the outside through the openings 34.

Flow through the connecting device 18 and/or the openings 34 takes place preferably at least essentially from the inside to the outside during filtration and/or the connecting device 18 and/or openings 34 are made for flow through them to take place from the inside to the outside during filtration.

In particular, the suggested filter system 17 is made to direct a medium, preferably the clean gas 26, from the inside and/or from a side facing the filter 19 to the outside and/or to a side facing away from the filter 19 through the openings 34.

The connecting device 18 is made in particular to accelerate a medium, in particular the clean gas 26, during filtration. Especially preferably the connecting device 18 acts as a nozzle and/or converging tube during filtration.

Figure 4:
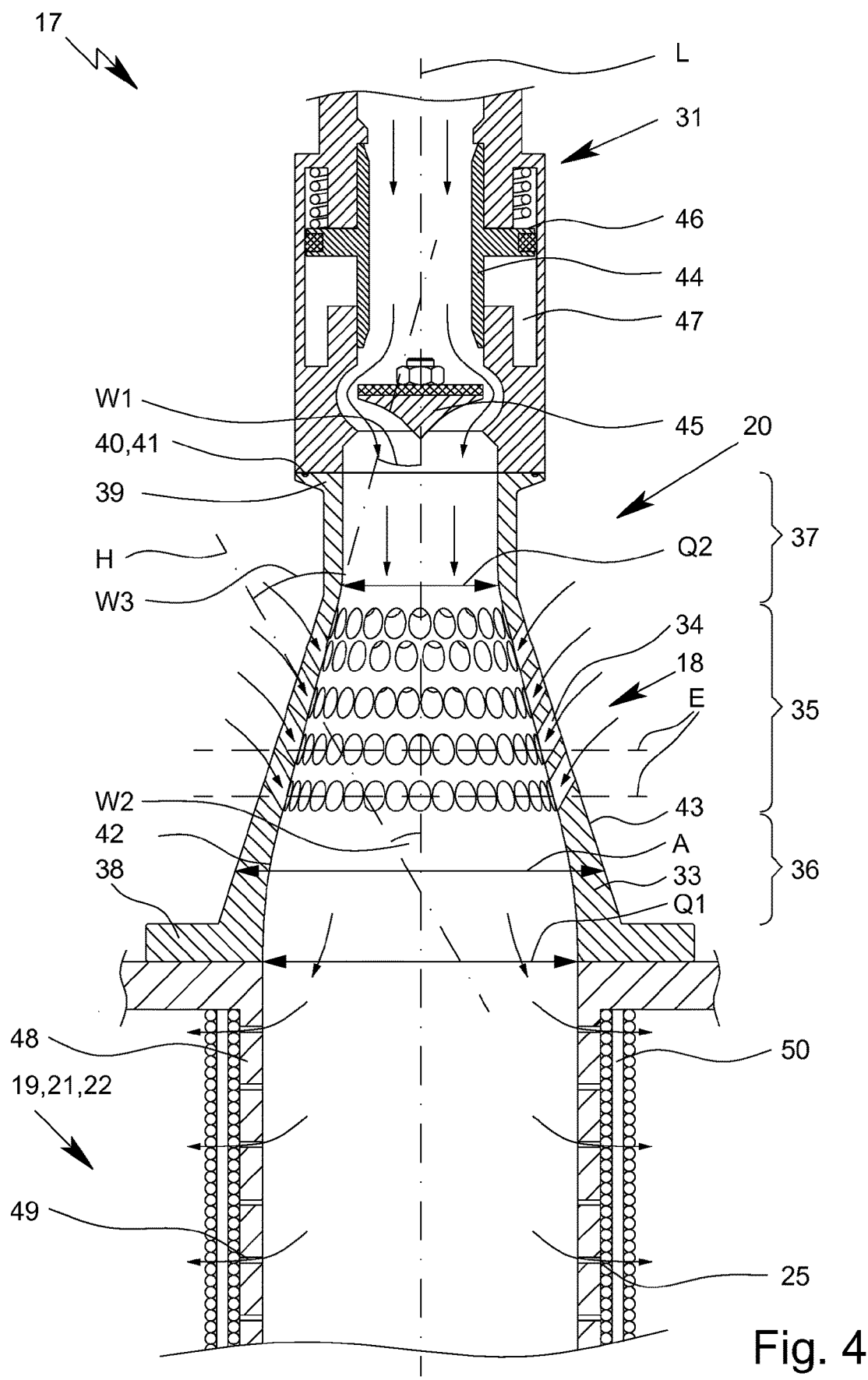
FIG. 4 shows a schematic section of the filter system according to FIG. 3 with the valve in the opened state.

FIG. 4 shows a schematic section of the connecting device 18 and of the partly shown filter 19 or of one of the filter sections 21 according to FIG. 3 together with the valve 31 in the opened state.

Preferably, the installation 1, the cleaning device 20 and/or the control apparatus 29 (compare FIG. 1) is or are made to at least essentially reverse the flow direction through the connecting device 18, in particular through the openings 34, and/or through the filter 19, in particular through one of the filter sections 21, preferably by means of opening or closing of the valve 31.

FIG. 4 shows the cleaning of one of the filter sections 21 or the partial cleaning of the filter 19.

The connecting device 18 and/or the cleaning device 20 is or are preferably made to retard a medium, in particular compressed air from the storage apparatus 28 (compare FIG. 1) during and/or for cleaning—in particular in the direction of increasing internal cross section Q—and/or to raise the static pressure of the medium, in particular of the compressed air of the storage apparatus 28—at least in the connecting device 18.

Preferably, the openings 34 are made to direct or suction another medium, in particular the clean gas 26, from the outside to the inside during and/or for cleaning. In particular the connecting device 18 and/or the cleaning device 20 is or are made to increase the mass flow of a medium, preferably of the compressed air of the storage apparatus 28, and/or to suction a second medium, preferably the clean gas 26—in particular through the and/or by means of the openings 34.

The connecting device 18 acts preferably during and/or for cleaning as a diffuser.

Especially preferably, the action of the connecting device 18 depends on the flow direction through the connecting device 18.

Especially preferably, flow takes place through the connecting device 18 and/or the filter 19, in particular one of the filter sections 21, during and/or for cleaning in one direction which is preferably at least essentially opposite the flow direction which prevails during and/or for filtration by means of the filter 19.

In one especially preferred embodiment of the connecting device 18, the connecting device 18 is made as a supercritical diffuser and/or the internal cross section Q increases along the longitudinal axis L with a first angle W1 greater than or equal to 8°.

The openings 34 are in particular made—at least during and/or for cleaning—to prevent and/or reduce flow separation, in particular at and/or on the inside 42 of the connecting device 18. Especially preferably, in the connecting device 18—at least during cleaning—there is an at least essentially laminar flow and/or the connecting device 18 is made to enable a laminar flow or to support the formation of a laminar flow.

Figure 5:
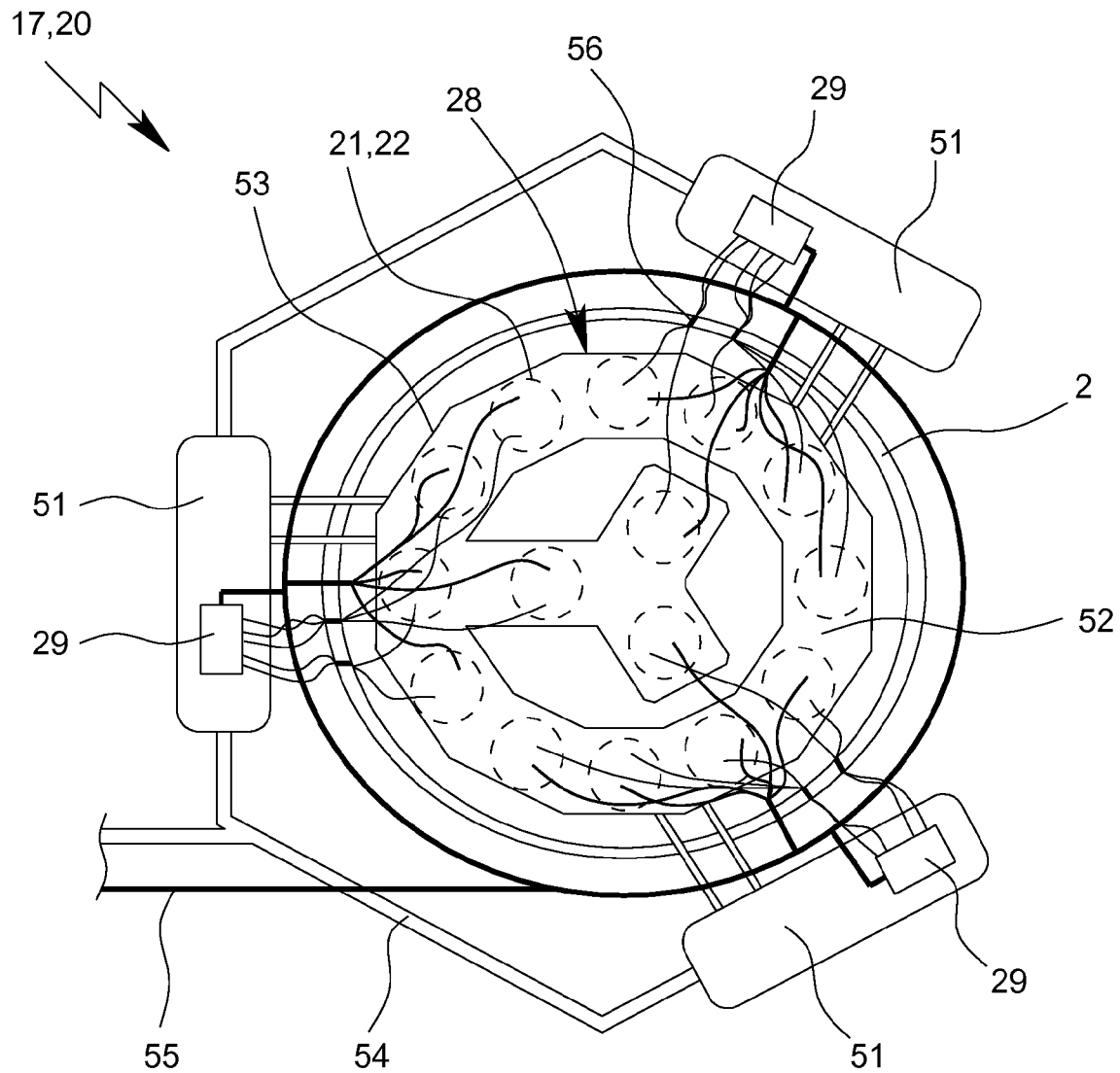
FIG. 5 shows a schematic plan view of the suggested filter system as well as a suggested cleaning device with a storage apparatus and several control apparatus.

FIG. 5 shows a schematic plan view of the suggested filter system 17 as well as of the suggested cleaning device 20 with the storage apparatus 28 as well as one or more, in particular synchronized, control apparatus 29 which are made preferably to control the valves 31 and/or to measure one or more differential pressures DP assigned to the filter sections 21.

The storage apparatus 28 is preferably made to supply the cleaning device 20 with a medium, in particular compressed air. Especially preferably the storage apparatus 28 is assigned to the filter system 17 and/or to the cleaning device 20 and/or is a component of the filter system 17 and/or of the cleaning device 20.

Preferably, the installation housing 2 has at least in part in the interior the storage apparatus 28 and/or the storage apparatus 28 is located at least essentially within or in the interior of the installation housing 2. In the embodiment shown in FIG. 5 the storage apparatus 28 is made both in the interior of the installation housing 2 and also outside of the installation housing 2.

Preferably, the storage apparatus 28 optionally has one or more storage units 51, as shown in FIG. 5. Preferably, the storage units 51 are located outside of the installation housing 2.

The storage apparatus 28 can be supplied from the outside with medium or compressed air, in particular by fluid connections between the storage unit(s) 51 and/or a compressor and the interior which is formed or surrounded by the storage apparatus 28. But it is also otherwise possible to supply compressed air or a medium to the storage apparatus 28.

The storage apparatus 28 has in particular a ring reservoir 52 which is located in the interior of the installation housing 2.

Preferably, the storage apparatus 28 and/or the ring reservoir 52 is made at least essentially as a ring or is made ring-shaped.

In the illustrated embodiment, the storage apparatus 28 and/or the ring reservoir 52 extends in the upper region of the installation housing 2, in particular in the dome region 8, and/or above the filter system 17 or the filter 19. But other designs or arrangements are also possible.

Preferably, the storage apparatus 28 is made as a gas reservoir, in particular as a reservoir for compressed air and/or as a line network, in particular as a gas line network, especially preferably as a compressed air line network. Especially preferably, the storage apparatus 28 is made to uniformly distribute and/or deliver a medium, in particular compressed air, to the valves 31 and/or to the filter system 17.

In particular, the storage apparatus 28 is made to supply several filter sections 21 of the filter 19 with a medium, in particular compressed air, individually and/or separated in time.

Preferably, the storage apparatus 28, in particular the ring reservoir 52, has at least two pipe segments 53 and/or is made of several pipe segments 53.

The pipe segments 53 are connected to one another or made integral, preferably by force-fit, form-fit and/or bonding, in particular by welding.

The pressure of the medium in the storage apparatus 28 is preferably more than 1 bar, in particular more than 2 bar, and/or less than 10 bar, in particular less than 8 bar, especially preferably less than 4 bar. The volume of the storage apparatus is preferably more than 50 l, in particular more than 100 l, especially preferably more than 200 l, and/or less than 1000 l, in particular less than 800 l, especially preferably less than 500 l. This has been found to be advantageous in conjunction with a compact construction and good cleaning performance.

Preferably, the storage apparatus 28, in particular the ring reservoir 52, is fluidically connected to the valve 31 and/or the connecting device 18.

Quite especially preferably, the valve 31 is located in the interior of the installation housing 2, in particular within the storage apparatus 28 and/or between the storage apparatus 28 and the connecting device 18. In particular, the storage apparatus 28, preferably the ring reservoir 52, is made to protect the valve 31 against an explosive atmosphere and/or to prevent direct contact of the valve 31 with an explosive atmosphere, in particular direct contact of the installation housing 2 and/or of the dome region 8.

Preferably, the installation housing 2, the cleaning device 20 and/or the storage apparatus 28 has or have several lines for supply of the cleaning device 20, of the storage apparatus 28, in particular of the ring reservoir 52, and/or of the valve 31 with a medium, in particular compressed air. In the embodiment shown in FIG. 5 the storage apparatus 28 is preferably supplied by means of a compressed air line 54 and/or the valve 31 is supplied by means of a control air line 55.

The control air line 55 is preferably made to alternately open or close the valve 31. Especially preferably, the control apparatus 29 controls or adjusts the valve 31 by means of the control air line 55. Quite especially preferably, the pressure in the control air line 55 is greater than the pressure in the compressed air line 54.

The installation housing 2 has preferably several penetrations 56, in particular the compressed air line 54 and/or the control air line 55 being routed through the penetration 56 from the outside to the inside into the installation housing 2.

Especially preferably, the control apparatus 29 is made to control the valve 31 for cleaning of the filter 19, in particular of one of the filter sections 21.

In the embodiment shown in FIG. 5, the installation 1, the filter system 17 and/or the cleaning device 20 preferably has or have several control apparatus 29, preferably a respective control apparatus 29 controlling and/or adjusting at least two valves 31.

The suggested cleaning method for sectional cleaning of the filter 19 is detailed below using FIGS. 6 to 10.

The cleaning method is executed preferably by means of the installation 1, the filter system 17, the connecting device 18, the cleaning device 20 and/or the control apparatus 29.

Figure 6:
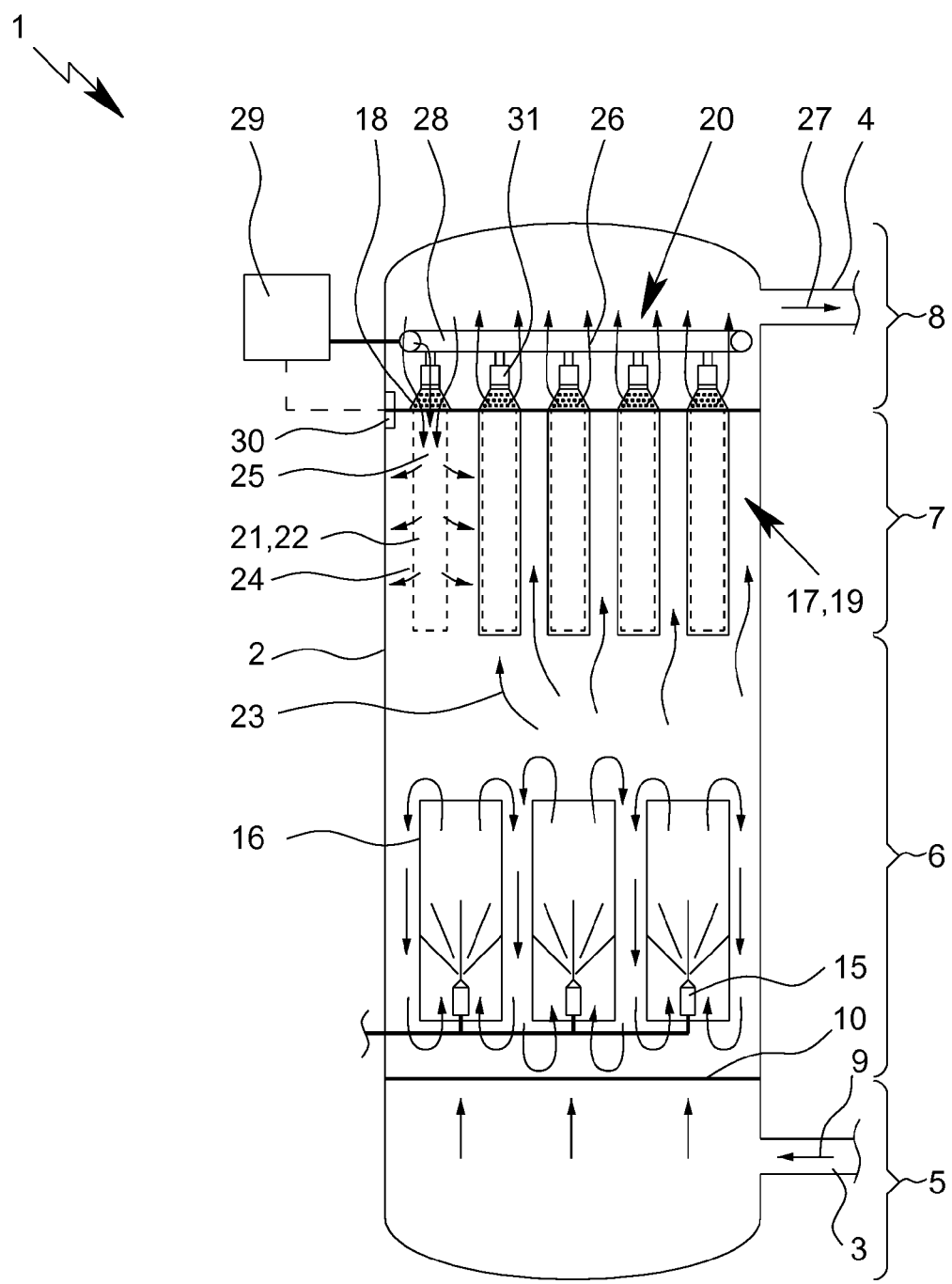
FIG. 6 shows a schematic side view of a suggested installation with a suggested filter system, a first filter section of the filter being cleaned.
Figure 7:
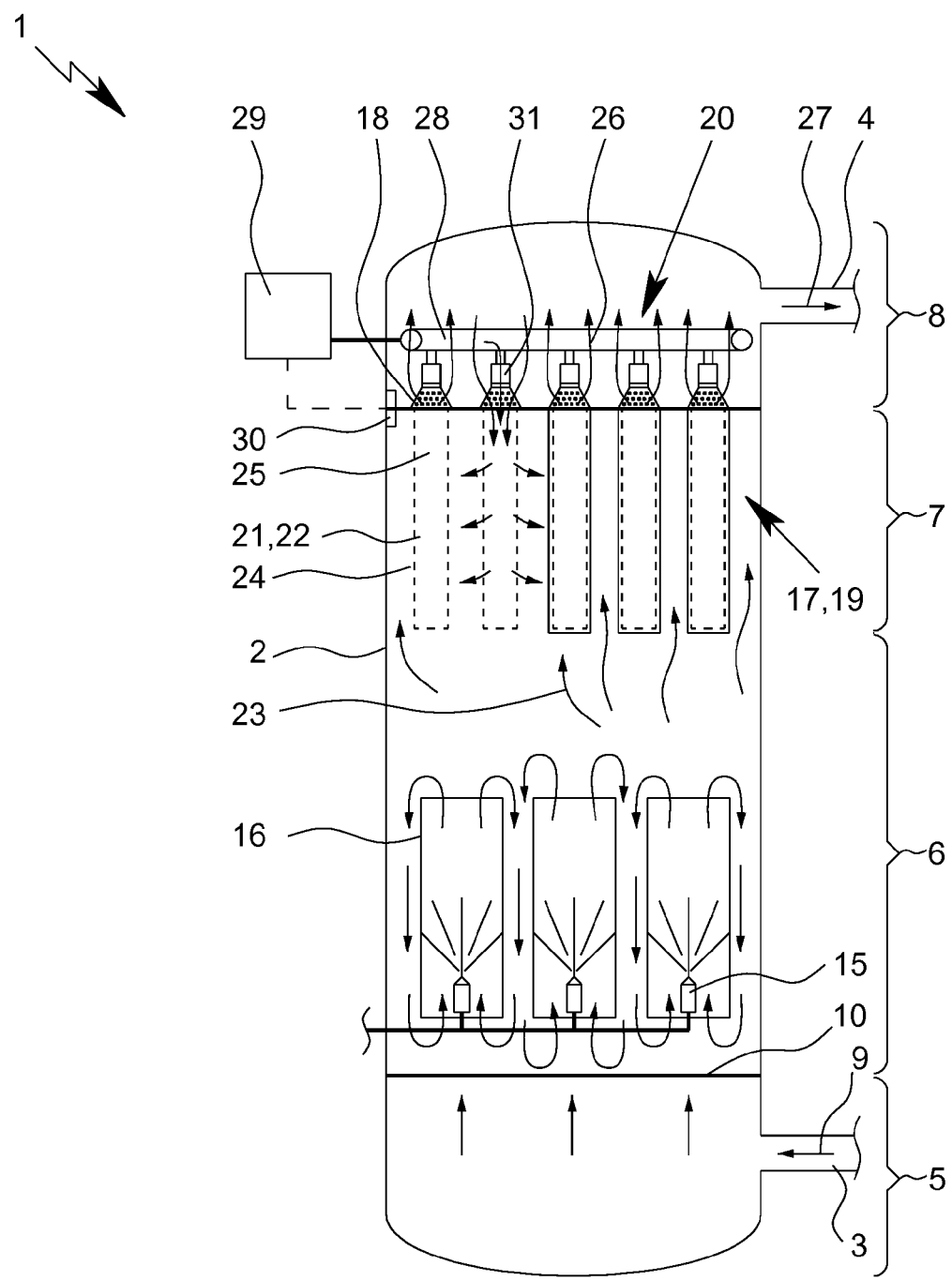
FIG. 7 shows a schematic side view of the installation according to FIG. 6, a second filter section of the filter being cleaned.

FIGS. 6 and 7 show the installation 1, the filter system 17, the connecting device 18, the cleaning device 20 and the control apparatus 29 as the suggested cleaning method is being carried out.

The filter system 17 and/or the filter 19 is cleaned in sections and/or partially during the cleaning method.

Preferably, the filter system 17 and/or the filter 19 has at least two, preferably at least three, in particular at least four, filter sections 21, in particular filter cartridges 22, by means of a cleaning process 57 one of the filter sections 21 and/or one of the filter cartridges 22 at a time being cleaned, as shown in FIGS. 6 and 7.

Preferably, in the suggested cleaning method, the filter sections 21 are cleaned in cleaning processes 57 which are offset or separated in time from one another. In particular the filter sections 21 are cleaned in cleaning processes 57 separated from one another by a time interval T1.

Preferably, in the cleaning method a cleaning process 57 is completely finished or ended before a further cleaning process 57 starts.

Especially preferably all filter sections 21 and/or filter cartridges 22 of the filter 19 and/or the entire filter 19 are cleaned within one cleaning cycle 58.

In particular, the cleaning method has at least two cleaning cycles 58.

Preferably, the end of one cleaning cycle 58 is separated in time by a time interval T2 from the start of a following cleaning cycle 58.

Preferably, the (second) cleaning cycle 58 directly follows the (first) cleaning cycle 58, in particular between the end of the (first) cleaning cycle 58 and the start of the (second) cleaning cycle 58 and/or during the time interval T1 and/or T2 no cleaning process 57 being triggered or carried out.

As shown in FIGS. 6 and 7, the filter system 17 or the filter 19 has especially preferably at least three filter sections 21, the filter sections 21 being cleaned in cleaning processes 57 separated from one another by time intervals T1.

Preferably, a cleaning process 57 and/or a cleaning cycle 58 is triggered by opening the assigned valve 31, preferably one valve 31 being assigned to one filter section 21 or filter cartridge 22 at a time and/or one filter section 21 at a time being cleanable by opening of the corresponding valve 31.

In particular, as already explained at the beginning, by triggering a cleaning process 57 the flow direction of the pertinent filter section 21 or of the pertinent filter cartridge 22 is reversed.

As shown in FIGS. 6 and 7, preferably the filtration is continued during cleaning of one of the filter sections 21 by means of the other filter sections 21. But other versions of the method are also possible, in particular in which filtration is stopped during the cleaning process 57.

FIG. 6 shows the cleaning of a first filter section 21 or a first filter cartridge 22, in particular compressed air being directed from the storage apparatus 28 through the assigned valve 31 and the suggested connecting device 18 into the filter section 21 or the filter cartridge 22, in particular by the valve 31 being opened.

Preferably, during the cleaning process 57 in addition to compressed air from the storage apparatus 28 another medium, in particular the clean gas 26, is directed into the filter section 21 or the filter cartridge 22, as is indicated by arrows in FIG. 6 and FIG. 7.

FIG. 7 shows the cleaning process 57 of another, second filter section 21 or another filter cartridge 22.

Preferably, in the suggested cleaning method, filter sections 21 adjacent to one another are cleaned in cleaning processes 57 offset in time from one another, as shown by means of FIG. 6 and FIG. 7. Especially preferably, the sequence in which the filter sections 21 are cleaned remains identical in each cleaning cycle 58. But other versions of the method are also possible, in particular in which the sequence in which the filter sections 21 are being cleaned is varied with each cleaning cycle 58.

In a quite especially preferable version of the method, in a cleaning cycle 58, first those filter sections 21 are cleaned which have the greatest distance to the compressed air line 54.

In the suggested cleaning method, preferably the time interval T1 between the cleaning processes 57, in particular within the respective cleaning cycle 58, and/or the time interval T2 between the end of one of the at least two cleaning cycles 58 is or are changed.

In particular, the time intervals T1 between successive cleaning processes 57 in the cleaning method are changed. In the sense of this invention the feature that "two cleaning processes 57 follow one another" should preferably be understood such that no further cleaning process 57 takes place between the two successive cleaning processes 57. The corresponding applies to successive cleaning cycles 58.

If the filter 19 has at least three filter sections 21, in the cleaning method the time interval T1 between the successive cleaning process 57 of a first and a second filter section 21 and the time interval T2 between the successive cleaning processes 57 of the second and a third filter section 21 are each changed.

Preferably, the time interval T1 and/or the time interval T2 is or are changed by means of feedback control 59 and/or feedback control 59 is carried out in the suggested cleaning method and causes a change or variation of the time intervals T1 and T2.

Figure 8:
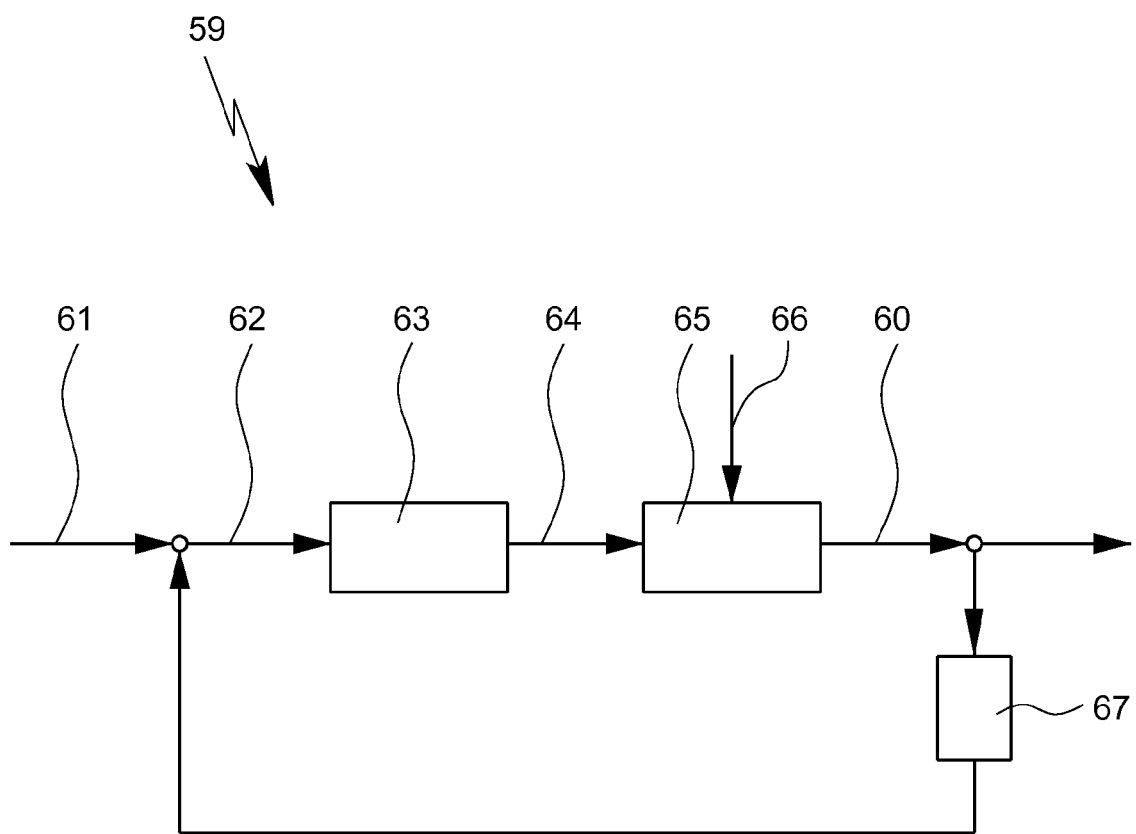
FIG. 8 shows a schematic block diagram of a feedback control underlying a suggested cleaning method.

FIG. 8 shows in this regard a schematic block diagram of the feedback control 59 underlying the suggested cleaning method or of the feedback control circuit of the feedback control 59.

Preferably, in the cleaning method and/or the feedback control 59, the differential pressure DP between the filter inlet 24 and the filter outlet 25 is adjusted and/or used as a controlled variable 60 in the feedback control 59.

Preferably, a target differential pressure SP is specified as a reference variable 61, in particular exogenously to the feedback control 59.

The target differential pressure SP is preferably more than 1000 Pa, in particular more than 2000 Pa, especially preferably more than 3000 Pa, and/or less than 7000 Pa, in particular less than 6000 Pa, especially preferably less than 5000 Pa. Quite especially preferably, the target differential pressure SP is at least essentially 4000 Pa.

Preferably, the target differential pressure SP in the cleaning process is kept constant. But other versions of the method are also possible in which the target differential pressure SP is changed.

Preferably, the difference between the target differential pressure SP and the differential pressure DP is used as the system deviation 62 in the feedback control 59 and/or in the cleaning method.

The feedback control 59 and/or the cleaning method uses or use preferably one controller, in particular a proportional-integral-derivative (PID) controller 63. But it is also possible to use other controllers in the feedback control 59 and/or in the cleaning method.

The triggering of a cleaning process 57 and/or the opening of the valve 31 or of one of the valves 31 and/or the length of the time interval T1 and/or T2 is preferably used as a manipulated variable 64 in the feedback control 59 and/or in the cleaning method.

The controller is preferably made to determine the manipulated variable 64 by means of the system deviation 62, in particular the system deviation 62 being multiplied by a factor, being integrated and/or being differentiated over a fixed time.

The cleaning method and/or the feedback control 59 preferably uses the filter system 17 and/or the cleaning device 20, preferably together with the storage apparatus 28, as the controlled system 65.

As shown in FIG. 8, optionally an influencing quantity 66 acts on the cleaning method and/or the feedback control 59, in particular on the controlled system 65. In particular, possible influencing quantities 66 include the increasing clogging and/or fouling of the filter 19, in particular of the filter sections 21, and/or the formation and/or increase of the filter cake 32, the degree of dust loading of the raw gas 23, the flow velocity in the installation housing 2, quantity and quality of the suspension 12 supplied to the installation housing 2 and/or quantity and quality of the inlet air 9 supplied to the installation housing 2.

In the cleaning method and/or in the feedback control 59, the differential pressure DP and or the system deviation 62 is preferably filtered with a control filter 67, preferably with a low-pass characteristic and/or such that peaks and/or fluctuations of the differential pressure DP caused by a cleaning process 57 and/or the cleaning processes 57 of one cleaning cycle 58 are at least essentially suppressed and/or filtered.

As already explained, the time interval T1 between two successive cleaning processes 57 and/or the time interval T2 between two successive cleaning cycles 58 with several cleaning processes 57 each is each determined by feedback control 59 which preferably has the control filter 67.

The control filter 67 is preferably made or designed such that both the pressure peaks which are produced by the respective cleaning process 57, in particular by feed of compressed air, and also pressure deviations based on the differential pressure DP which has changed after the completion of a cleaning process 57 are smoothed and/or averaged.

Preferably, the control filter 67 has a three-dB cut-off frequency or critical frequency of one preferred low-pass characteristic which is smaller than 1/(2×π×time constant), the time constant preferably being greater than the minimum time interval T1, the minimum time interval T2 and/or greater than 1 s, preferably greater than 2 s or 4 s, in particular greater than 5 s. Alternatively or additionally, the time constant is preferably smaller than the sum of the time intervals T1 of the cleaning processes 57 of one cleaning cycle 58, less than 30 s, preferably less than 25 s, especially preferably less than 20 s or 15 s. The control filter 67 can however have a filter characteristic other than a lowpass characteristic, its being preferred that it is made to smooth deviations of the differential pressure DP which have been caused by cleaning processes 57.

The differential pressure DP or the difference between the differential pressure DP and target differential pressure SP in the sense of this invention is then regarded as smoothed when the deviations caused by or in a cleaning process 57 are reduced or damped by more than 10%, preferably more than 20%, in particular more than 30% or 40%.

In one especially preferably embodiment, the feedback control 59 is designed such that the control filter 67 damps frequencies above 10 Hz, preferably above 5 Hz, in particular above 2 Hz or 1 Hz, by more than 50%.

Figure 9:
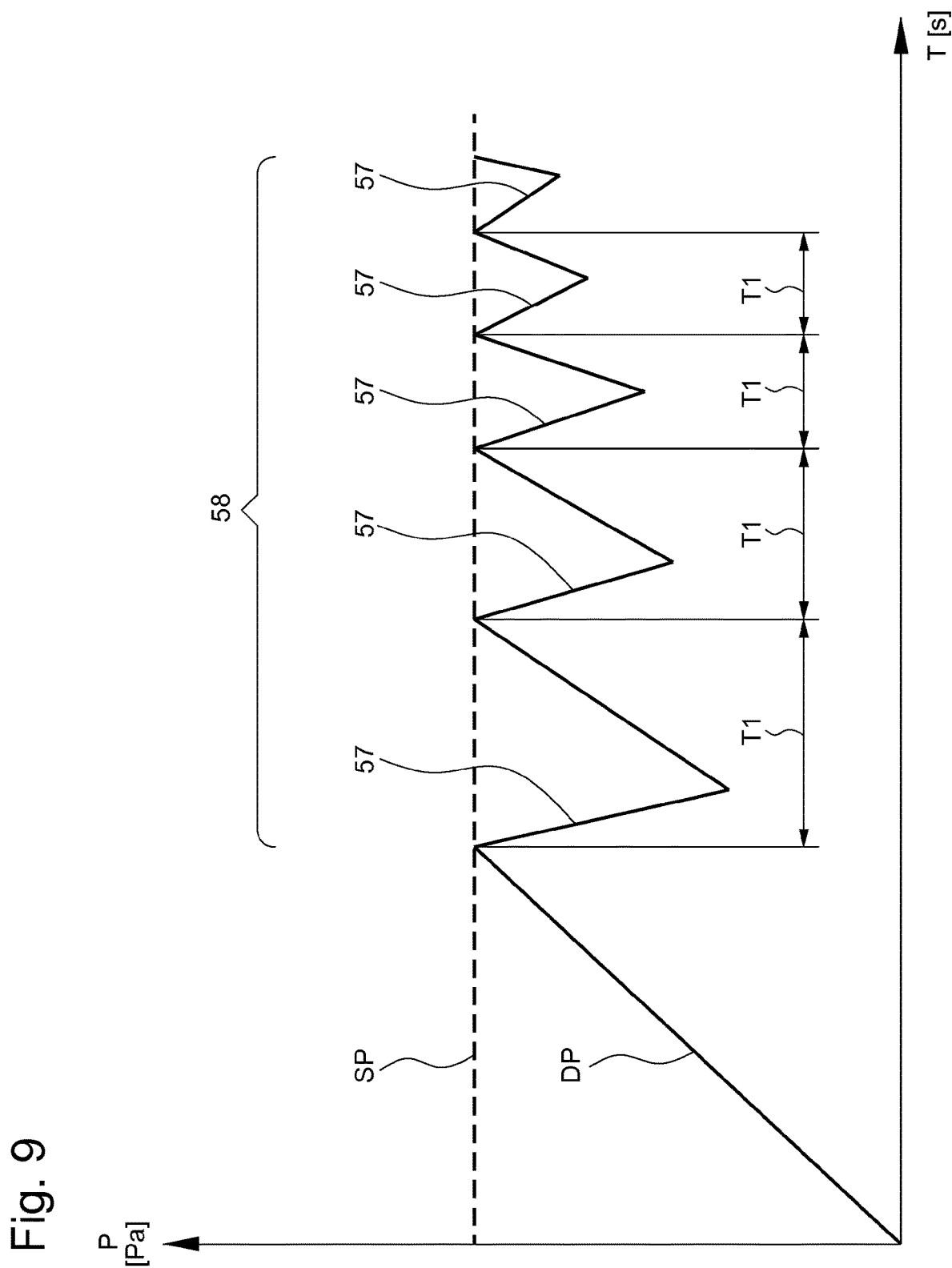
FIG. 9 shows a schematic of the pressure as a function of time in the suggested cleaning method according to a first version of the method.

FIG. 9 shows a schematic of the pressure P as a function of the time T in the suggested cleaning method according to a first version of the method.

In the illustrated cleaning method, preferably five filter sections 21 are cleaned by means of a respective cleaning process 57 in a cleaning cycle 58, the time intervals T1 between the cleaning processes 57 being changed each time.

In the illustrated example, the time intervals T1 between the cleaning processes 57 become smaller with increasing clogging and/or fouling of the filter sections 21, in particular of the filter cloth 50 and/or with time.

Preferably, the time at which a cleaning process 57 is completed or takes place is less than 10 s, in particular less than 5 s, especially preferably less than 2 s. Quite especially preferably, the time of one cleaning process 57 is at least essentially 1 s.

Preferably, the time for one cleaning process 57 is less than the time which cleaned particles, in particular the suspension dust and/or the filter cake 32 requires or require to travel or fall out of the immediate suction area of the respective filter section 21 during the cleaning process 57.

In particular, during and/or after a cleaning process 57, refiltration of particles cleaned by the cleaning process 57 is prevented, avoided or reduced.

Preferably, the time intervals T1 between the cleaning processes 57 are limited with a maximum value and/or a minimum value, preferably the maximum value and/or the minimum value being specified exogenously to the feedback control 59 and/or the cleaning method.

Especially preferably, the maximum value is less than 500 s, in particular less than 400 s, especially preferably less than 300 s, and/or the minimum value is more than 5 s, in particular more than 10 s, especially preferably more than 15 s.

Preferably, the differential pressure DP rises during filtration by means of the filter 19, in particular when a cleaning process 57 is not taking place.

In the illustrated characteristic, the differential pressure DP increases preferably at least essentially linearly with the time T or the difference between the differential pressure DP and the target differential pressure SP decreases essentially linearly with the time T. But other curve characteristics are also possible.

A cleaning process 57 is preferably triggered when the differential pressure DP reaches the target differential pressure SP, exceeds it and/or approaches it. In particular, a cleaning process 57 is triggered depending on the differential pressure DP, the system deviation 62 and/or on the, preferably previous, time interval T1 and/or time interval T2. Especially preferably, the controller of the feedback control 59 determines the instant of triggering of a cleaning process 57 and/or the start of a cleaning cycle 58.

Preferably, the differential pressure DP drops during the cleaning process 57 and/or by the cleaning process 57. In particular, the difference between the differential pressure DP and the target differential pressure SP increases during the cleaning process 57 and/or by the cleaning process 57.

As shown in FIG. 9, the differential pressure DP rises again after completion of the cleaning process 57 or the difference between the differential pressure DP and the target differential pressure SP decreases.

Especially preferably the differential pressure DP after cleaning or after one cleaning process 57 rises linearly and/or at least essentially as before cleaning or a cleaning process 57. But other curve characteristics are also possible, in particular in which the gradient of the differential pressure DP increases with the time T and/or with the number of triggered cleaning processes 57.

Depending on the controller of the feedback control 59, after a first cleaning process 57 another cleaning process 57 is triggered, in particular when the differential pressure DP again reaches, exceeds and/or approaches the target differential pressure SP.

Preferably, the differential pressure DP drops in a cleaning process 57 at least essentially to the same value as in the previous cleaning process 57 or the differential pressure DP after successive cleaning processes 57 is at least essentially the same.

As FIG. 9 illustrates, the differential pressure DP which prevails immediately after completion of a cleaning process 57 increases with the time T.

In particular, the time until the differential pressure DP reaches the target differential pressure SP, exceeds it and/or approaches the target differential pressure SP decreases with the time T.

The time interval T1 between two successive cleaning processes 57, in particular between the start of two successive cleaning processes 57 and/or the end of two successive cleaning processes 57 and/or the end of one and the start of a following cleaning process 57 becomes preferably at least essentially exponentially smaller, preferably during filtration by means of the filter 19 and/or with the time T.

Especially preferably, with the suggested cleaning method, the time interval T1 and/or the time interval T2 is adjusted and/or used as a controlled variable 60 or controlled variables 60 in the feedback control 59.

In particular, the time interval T1 and/or the time interval T2 is/are used as the manipulated variable 64 or manipulated variables 64 in the feedback control 59 or in the cleaning method.

Especially preferably, the time intervals T1 and T2 are not directly derived from the differential pressure DP or the comparison of the differential pressure DP to the target differential pressure SP. It is preferred that the time interval T1 and the time interval T2 are computed, defined or determined by the feedback control 59, especially preferably by means of the control apparatus 29.

In the illustrated curve characteristic, all five filter sections 21 are cleaned in one cleaning cycle 58. Preferably, after the end of the illustrated cleaning cycle 58, a following cleaning cycle 58 (not shown) begins.

FIG. 10 shows a schematic representation of the pressure P as a function of the time T in the suggested cleaning method according to a second version of the method, in particular, the time interval T1 being at least essentially constant within one cleaning cycle 58.

Preferably, a cleaning process 57 is triggered at the start of the respective cleaning cycle 58 when the differential pressure DP reaches the target differential pressure SP, exceeds it and/or approaches the target differential pressure SP.

Preferably, the time interval T1 between successive cleaning processes 57 of one cleaning cycle 58 is changed in particular by means of the above explained feedback control 59 and/or for the entire cleaning cycle 58 is fixed at an at least essentially constant value. In particular, the subsequent cleaning processes 57 take place within the cleaning cycle 58 regardless of the differential pressure DP and/or the target differential pressure SP and/or after the time interval T1.

The time interval T1 between successive cleaning processes 57 within one cleaning cycle 58 is preferably changed and/or fixed before and/or at the start of the cleaning cycle 58, preferably by means of the feedback control 59, and/or is held constant at the previously established value during the entire cleaning cycle 58.

As FIG. 10 shows, in this version of the method, the differential pressure DP which prevails at the start of one cleaning process 57 and/or at the end of one cleaning process 57 can drop and/or rise within one cleaning cycle 58.

In the illustrated example, the filter 19 preferably has three filter sections 21 and/or one cleaning cycle 58 encompasses three cleaning processes 57.

If all filter sections 21 in one cleaning cycle 58 are cleaned by means of the cleaning processes 57, the cleaning cycle 58 is ended.

Preferably, after completion of one cleaning cycle 58, separated in time by the time interval T2, a further following cleaning cycle 58 starts, in particular the time interval T2 of successive cleaning cycles 58 being changed.

Preferably, another cleaning cycle 58 starts with the triggering of a cleaning process 57. As shown in FIG. 10, the time intervals T1 in the second cleaning cycle 58 are changed compared to the first cleaning cycle 58.

Preferably, the time intervals T2 from cleaning cycle 58 to cleaning cycle 58 and/or with the time T become smaller But other variations are also possible.

Preferably, the differential pressure DP with time T increasingly approaches the target differential pressure SP.

When the differential pressure DP can no longer be adjusted by means of the cleaning method and/or the feedback control 59, in particular when the differential pressure DP exceeds the target differential pressure SP by a previously fixed value and/or the time interval T1 and/or the time interval T2 reaches a previously established minimum value, the filter 19 is preferably completely cleaned, in particular wet, preferably the installation 1 and/or the filter system 17 being shut down and/or the filtration being adjusted by means of the filter 19.

Preferably, the time intervals T1 are changed such that the number of cleaning processes 57 is minimized and/or the time until necessary wet cleaning of the filter 19 is maximized.

Individual aspects and features of the different embodiments and versions of the method can be implemented independently of one another, but also in any combination with one another.

What is claimed is:

1. A system comprising: an installation housing comprising a housing inlet, a housing outlet and a filter system positioned between the housing inlet and the housing outlet; wherein the filter system comprises a plurality of filters, a plurality of connecting devices and a plurality of cleaning devices, wherein each filter is connected to one of the cleaning devices by one of the connecting devices; wherein each connecting device forms an adapter having a first connection apparatus at a first axial end for connection to the cleaning device and a second connection apparatus at an opposite second axial end for connection to the filter, each connecting device having a side wall which delimits an internal cross section, the side wall comprising at least one portion in which the internal cross section increases along a longitudinal axis of the connecting device in the direction of said second axial end, and the side wall having openings, wherein each connecting device is open at both the first axial end and the second axial end, wherein the side wall of each connecting device has a first portion with said openings, a second portion free of openings in a region of the greatest internal cross section and a third portion that is free of openings at a smallest internal cross section of the connecting device, wherein the third portion comprises the first axial end and the connecting device is connected to the cleaning device at the first axial end by means of the first connection apparatus;

wherein each cleaning device is configured to clean each filter by means of a gas flowing in the direction of increasing internal cross section of each connecting device, and wherein each connecting device comprises a valve provided for controlling the direction of flow through the connecting device, wherein the system is configured such that in a closed position of each valve, gas flow is able to travel from the second axial end out through said openings, and the system is configured such that, in an open position of each valve, additional gas is able to be sucked in through said openings by gas flow from each cleaning device through said open first axial end.

2. The system as claimed in claim 1, wherein each of the openings has a major axis that runs obliquely relative to the side wall and said longitudinal axis and wherein each major axis runs from outside to inside in a direction toward said second portion.

3. The system as claimed in claim 1, wherein a diameter or a width of the smallest internal cross section is greater than 30 mm.

4. The system as claimed in claim 1, wherein the openings are oriented in one or more planes, each plane being defined by at least three circumferentially arranged openings.

5. The system as claimed in claim 1, wherein the openings are arranged in planes and wherein the number of openings per plane increases with increasing internal cross section.

6. The system as claimed in claim 1, wherein the openings have a diameter or a width which is at least one of: more than 2% of the diameter or width of the greatest internal cross section, and/or less than 20% of the diameter or of the width of the greatest internal cross section, and/or at least 5 mm, and/or at most 40 mm.

7. The system as claimed in claim 1, wherein the first connection apparatus and/or the second connection apparatus comprises at least one of a flange, a clamp connection and a screwed pipe joint.

8. The system as claimed in claim 1, wherein an inner side of the side wall is at least partially concave, convex or bell-shaped.

9. The system as claimed in claim 1, wherein the side wall has a portion with a constant inner cross section.

10. A method of connecting a plurality of filters to a plurality of cleaning devices in an installation comprising an installation housing, a housing inlet, a housing outlet and a filter system positioned between the housing inlet and the housing outlet; wherein the filter system comprises the plurality of filters, the plurality of connecting devices and the plurality of cleaning devices, wherein each filter is connected to one of the cleaning devices by one of the connecting devices; comprising:

providing the connecting devices for the connection of each cleaning device, each connecting device forming an adapter having a first connection apparatus at a first axial end at which one of the cleaning devices is connected and a second connection apparatus at an opposite second axial end one of the filters is connected, each connecting device having a side wall, the side wall comprising at least one portion in which the internal cross section increases along a longitudinal axis of the connecting device in the direction of said second axial end, and the side wall having openings, wherein each connecting device is open at both the first axial end and the second axial end, wherein each side wall has a first portion with said openings, a second portion free of openings in a region of the greatest internal cross section and a third portion that is free of openings at a smallest internal cross section of the connecting device, wherein the third portion comprises the first axial end and each connecting device is connected to each cleaning device at the first axial end by means of the first connection apparatus; further comprising:

configuring each cleaning device to clean the filter to which it is connected by means of a gas flowing in the direction of increasing internal cross section of the respective connecting device, and providing a plurality of valves, each valve controlling the direction of flow through a respective connecting device in manner causing gas flow to travel from the respective filter out through said openings in a closed position of the valve, and causing additional gas to be sucked in through said openings by gas flow from the respective cleaning device through said open first axial end in an open position of the valve.

11. The method according to claim 10, wherein each of the openings has a major axis that runs obliquely relative to the side wall and the longitudinal axis and wherein each major axis runs from outside to inside in a direction toward said second section and wherein the openings are oriented in at least one plane which is aligned orthogonally to the longitudinal axis.

\* \* \* \* \*